(12) United States Patent
Cuk

(10) Patent No.: US 9,231,471 B2
(45) Date of Patent: Jan. 5, 2016

(54) HYBRID-SWITCHING STEP-DOWN CONVERTER WITH A HYBRID TRANSFORMER

(75) Inventor: Slobodan Cuk, Laguna Niguel, CA (US)

(73) Assignee: CUKS, LLC, Laguna Niguel, CA (US)

( * ) Notice: Subject to any disclaimer, the term of this patent is extended or adjusted under 35 U.S.C. 154(b) by 466 days.

(21) Appl. No.: 13/073,888

(22) Filed: Mar. 28, 2011

(65) Prior Publication Data

US 2012/0249102 A1    Oct. 4, 2012

(51) Int. Cl.
*H02M 3/158*    (2006.01)
*H02M 1/00*    (2007.01)

(52) U.S. Cl.
CPC ............ *H02M 3/158* (2013.01); *H02M 3/1584* (2013.01); *H02M 3/1588* (2013.01); *H02M 2001/0054* (2013.01); *H02M 2003/1586* (2013.01); *Y02B 70/1425* (2013.01)

(58) Field of Classification Search
CPC ..................... H02M 2001/0054; H02M 3/156; H02M 3/158; H02M 3/1584; H02M 2003/0586; H02M 3/1588
USPC .................. 323/259, 262, 263, 271, 272, 282
See application file for complete search history.

(56) References Cited

U.S. PATENT DOCUMENTS

| | | | |
|---|---|---|---|
| 6,486,642 B1 * | 11/2002 | Qian ............................ | 323/259 |
| 6,989,997 B2 * | 1/2006 | Xu et al. ........................ | 363/16 |
| 7,321,224 B2 * | 1/2008 | Iwamoto et al. .............. | 323/262 |
| 7,915,874 B1 * | 3/2011 | Cuk ............................... | 323/224 |
| 8,207,717 B2 * | 6/2012 | Uruno et al. ................... | 323/262 |
| 2001/0024373 A1 * | 9/2001 | Cuk ................................ | 363/16 |
| 2002/0118000 A1 * | 8/2002 | Xu et al. ........................ | 323/259 |

OTHER PUBLICATIONS

Slobodan Cuk, "Modelling, Analysis and Design of Switching Converters", PhD thesis, Nov. 1976, California Institute of Technology, Pasadena, California, USA;www.caltech.edu.*

Vatche Vorperian, "Resonant Converters", PhD thesis, California Institute of Technology, Pasadena, California, USA; www.caltech.edu.*

Steve Freeland, "A Unified Analysis of Converters with Resonant Switches; II Input Current Shaping " PhD thesis, Oct. 20, 1987,Caltech, Pasadena, California; www.caltech.edu.*

Slobodan Cuk, "Modeling, Analysis and Design of Switching Converters", PhD thesis, Nov. 1976, California Institute of Technology, Pasadena, California, USA; www.caltech.edu.*

(Continued)

*Primary Examiner* — Fred E Finch, III

(57) ABSTRACT

The present invention employs a resonant inductor, a resonant capacitor and a hybrid transformer using a Hybrid-switching method with three switches which results in two distinct switched-networks: one for ON-time interval and another for OFF-time interval. Resonant inductor is placed in series with the hybrid transformer primary to insure the continuity of primary and secondary currents at the switching transitions and thus eliminating completely the potential switching losses at the switching transitions. In the best use of the invention the resonant inductor is replaced by use of the inherent leakage inductance of the transformer and for the first time eliminate the switching losses always associated with the transformer leakage inductance of all other switching converters. The output voltage is controlled by the standard Pulse Width Modulated (PWM) duty ratio control.

17 Claims, 29 Drawing Sheets

(56) References Cited

OTHER PUBLICATIONS

Vatche Vorperian, "Resonant Converters", PhD thesis, May 1984, California Institute of Technology, Pasadena, California, USA; www.caltech.edu.*

Steve Freelan, "A Unified Analysis of Converters with Resonant Switches; Input Current Shaping for Single-Phase Ac-Dc Power Converters", PhD thesis, Oct. 20, 1987, Caltech, Pasadena, California; www.caltech.edu.*

Dragan Maksimovic, "Synthesis of PWM and Quasi-Resonant DC-to-DC Power Converters", PhD thesis, Jan. 12, 1989, Caltech, Pasadena, California; www.caltech.edu.*

* cited by examiner

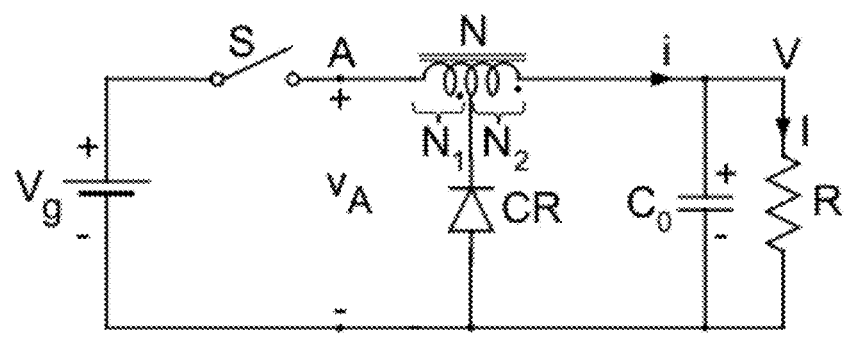
Fig. 3a (Prior art)
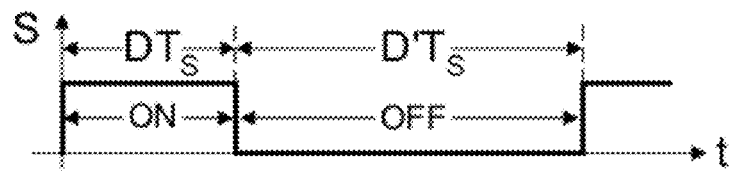
Fig. 3b
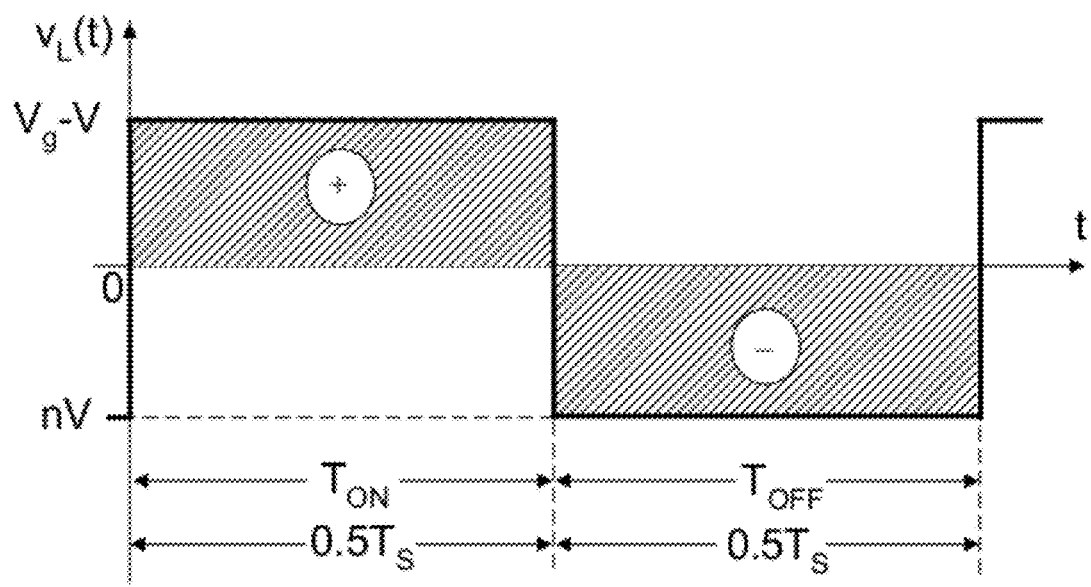
Fig. 3c (Prior-art)

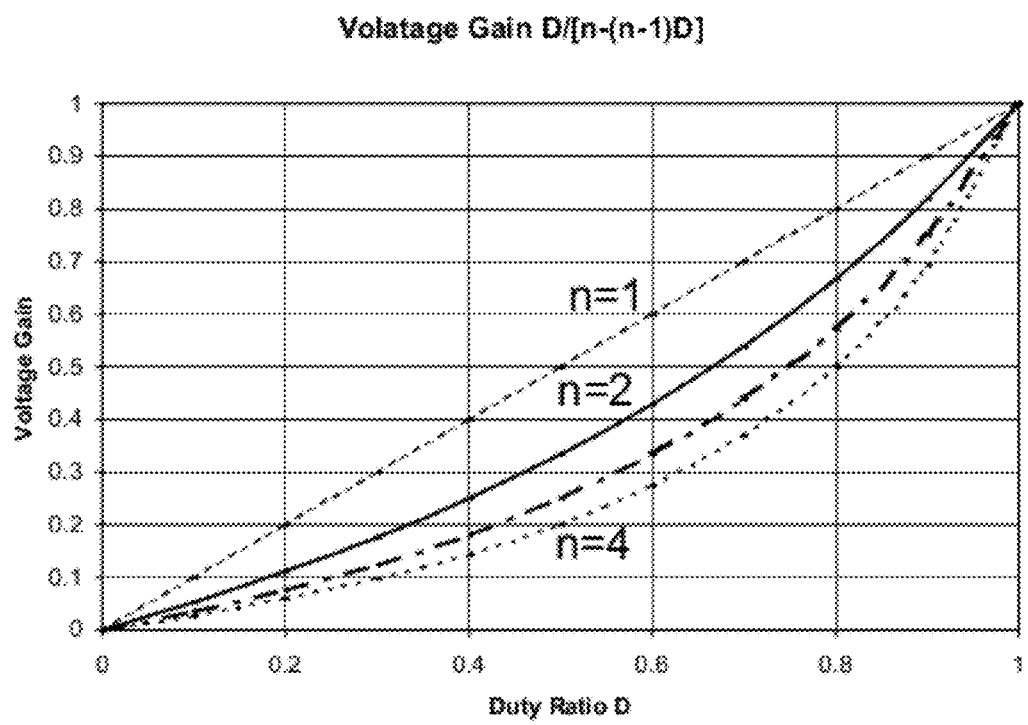
Fig. 4a (Prior-art)
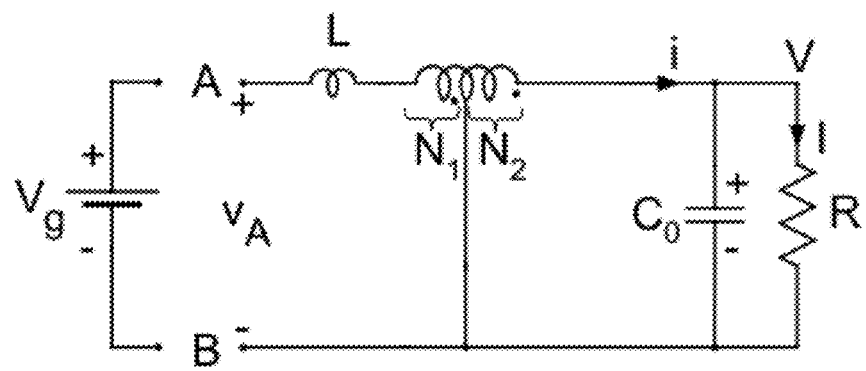
Fig. 4b
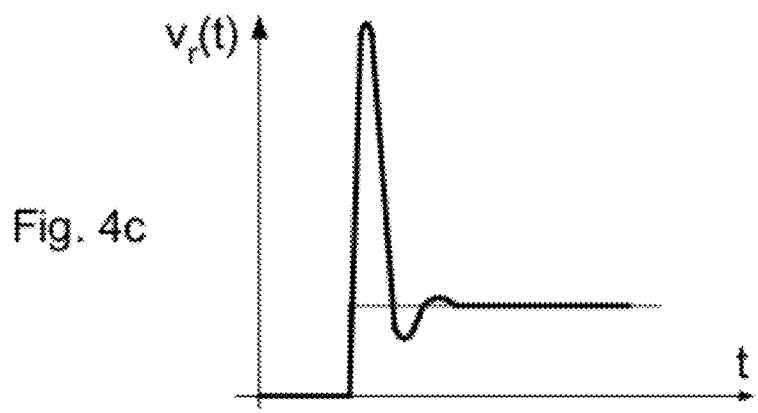
Fig. 4c

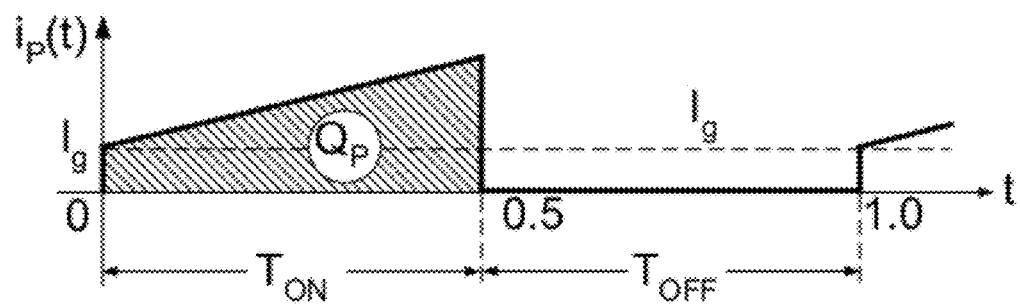
Fig. 5a (Prior-art)
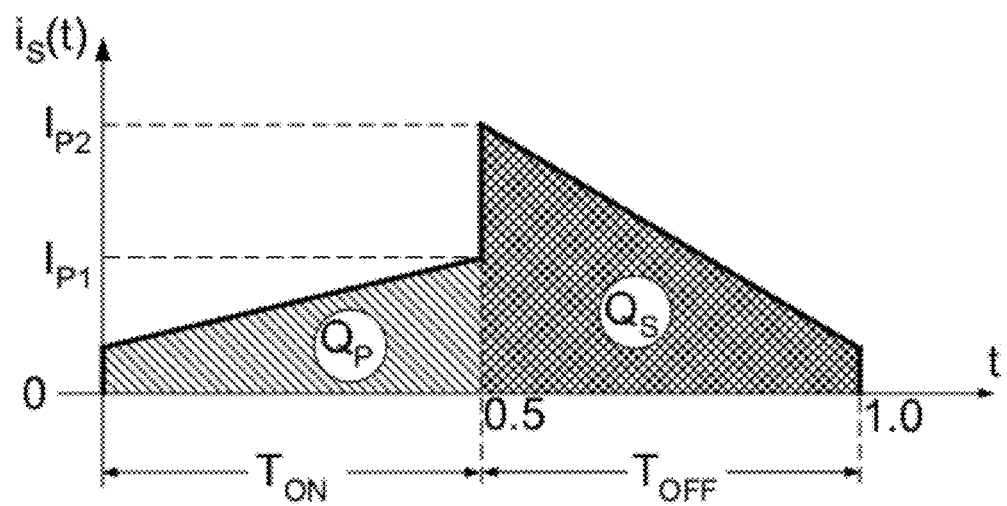
Fig. 5b (Prior-art)

HYBRID-SWITCHING STEP-DOWN CONVERTER WITH A HYBRID TRANSFORMER

FIELD OF THE INVENTION

The non-isolated switching DC-to-DC converters can be broadly divided into three basic categories based on their input to output DC voltage conversion characteristics: a) step-down only (buck converter), step-up only (boost converter) and step-down/step-up such as flyback, SEPIC, and Ćuk converters (1,2). This invention relates to the step-down class of switching DC-to-DC power converters such as buck converter.

Many Point of Load Applications (POL) and Voltage Regulator Modules (VRM's) require a rather large step-down conversion ratios, such as 12:1 or even 24:1 to convert the standard 12V input voltage to 1V or 0.5V output regulated voltage required by the modern microprocessors and other electronic loads. This invention also relates to this particular subset of the step-down converters. However, it is equally applicable to a broader class of other moderate to high step-down voltage conversions.

Classifications of currently known switching converters can also be made based on the type of the voltage and current waveforms exhibited by the switches into three broad categories:

a) Square-wave switched-mode converters in which inductors, transformers and autotransformers are subjected to square-wave like voltage excitations and are volt-second (flux) balanced over the entire switching period (1,2).

b) Resonant converters (sometimes also called true resonant converters) such as series resonant and parallel resonant converters (3) in which a single resonant inductor is inserted into topology of conventional square-wave switched-mode converter, such as bridge-type converters, and is therefore flux balanced over the entire switching period so that either switch voltages or switch currents are sinusoidal-like over the entire switching cycle with their peak magnitude several times higher than their square-wave equivalent resulting in higher voltage and/or current switch stresses than square-wave converters;

c) Resonant-switch converters, also referred to as multi-resonant converters (4) in which resonant components (resonant inductors and resonant capacitors are added to the switches of the Square-wave converters with the similar increase in the peak voltage and peak currents of the switches and likewise having their resonance's extended over the entire switching cycle (4).

The present invention creates an entirely different new fourth category of the hybrid-switching converters consisting of a resonant inductor and a resonant capacitor forming a resonant circuit for a part of a switching period and a hybrid transformer obeying square-wave switching laws over the entire switching period. Because of the mixed use of the square-wave switching and unique resonant inductor switching a term hybrid-switching method is proposed for this new switching power conversion method. The resonant capacitor takes a dual role, as it forms a resonant circuit during OFF-time interval with the resonant inductor, while during ON-time interval operates like a capacitive energy storage and transfer device such as, for example, in the Ćuk converter (1,2), but here being charged by the magnetizing inductance of the hybrid transformer and not input and output PWM inductors as in Ćuk converter.

Another classification can be made with respect to number of switches used, such as two, four, six etc. The present Square-Wave Switching or Pulse Width Modulated (PWM) switched-mode power conversion theory (and their resonant modifications described above) a-priori excludes the converter topologies with the odd number of switches, such as 3 switches, 5 switches (5). The PWM switching method is based on the classical square-wave switching characterized by square-wave like current and voltage waveforms of its switches over the entire switching period. The direct consequence is that switches come in complementary pairs: when one switch is closed its complementary switch is open and vice versa. Thus when half of the switches are ON their complementary switches are OFF and vice versa for second OFF-time interval. Thus, the converters are characterized by two distinct switching intervals (ON-time interval and OFF-time interval) and even number of switches, such as 2, 4, 6, and cannot have an odd number of switches, such as 3, 5, etc.

The present invention breaks the new ground by introducing the switching converters featuring three switches, which results in hybrid switched-mode power conversion method. Despite the clear use of the resonant capacitor discharge during the OFF-time interval and half-sinusoidal resonant discharge current, the output DC voltage is controlled by a simple duty ratio control and NOT by use of the conventional resonant simple control of output DC voltage by duty ratio D control and not by conventional resonant control methods. Furthermore, unlike in the conventional resonant converters, the output DC voltage is to the first order independent of the DC load current and dependent on duty ratio D only as in conventional PWM converters.

The present invention also breaks another new ground by using a hybrid transformer in a dual role of transferring inductive and capacitive energy storage through it. Present modifications of the buck converter such as tapped-inductor buck use tapped inductor to transfer inductive energy storage only to the output but do not have capacitive energy storage.

OBJECTIVES

The main objective is to provide an alternative to the present buck converter and tapped inductor buck converter to provide the converter with large step-down conversion ratios needed, such as 24:1 and achieve that with much improved efficiency while providing simultaneously magnetic size reductions and a fast transient response. This is achieved by providing step-down converter with a hybrid transformer, which in addition to inductive energy transfer of tapped-inductor buck converter, provides a simultaneous transfer of the resonant capacitor discharge current to the load via the same two winding magnetic structure but now operating as a true ac transformer during the OFF-time interval, hence the proposed name hybrid transformer. Both energy transfer mechanisms provide the increased total current to the load at any duty ratio thereby increasing voltage step-down significantly.

Although one of the main applications of the present invention is for the large step-down (12:1) or higher and low output voltages such as 1V or lower, the same advantages described are also applicable to other output voltages and moderate step-down conversion ratios such as 48V to 12V and 15V to 3.3V conversion.

DEFINITIONS AND CLASSIFICATIONS

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta v_r$—The AC ripple voltage on resonant capacitor $C_r$;
6. $\Delta v$—The AC ripple voltage on output capacitor C;
7. $f_S$—Switching frequency of converter;
8. $T_S$—Switching period of converter inversely proportional to switching frequency $f_S$;
9. $S_1$, $S_2$ and $S_3$ switches—switch $S_1$ operates in complementary way to switches $S_2$ and $S_3$: when $S_1$ is closed, $S_2$ and $S_3$ are open, and vice versa.
10. $T_{ON}$—ON-time interval $T_{ON}=DT_S$ during which switch $S_1$ is turned-ON;
11. $T_{OFF}$—OFF-time interval $T_{OFF}=D'T_S$ during which switch $S_1$ is turned OFF and switch $S_2$ turned ON;
12. D—Duty ratio of the main controlling switch $S_1$.
13. D'—Complementary duty ratio D'=1−D of the switch $S_1$.
14. $f_r$—Resonant frequency defined by resonant inductor $L_r$ and resonant capacitor $C_r$;
15. $T_r$—Resonant period defined as $T_r=1/f_r$;
16. CR—two terminal Current Rectifier whose ON and OFF states depend on switch states of controlling switch $S_1$.
17. $L_r$—Resonant inductor obeying resonant switching laws.
18. $C_r$—Resonant capacitor obeying both resonant switching laws for OFF-time interval and square wave PWM switching laws for ON-time interval.
19. HT—Hybrid transformer obeying PWM square-wave switching laws.
20. $N_1$—primary number of turns of the hybrid transformer;
21. $N_2$—secondary number of turns of the hybrid transformer.
22. N—sum of the primary turns $N_1$ and secondary turns $N_2$ of the hybrid transformer.
22. $n=N/N_2$ is voltage conversion ratio of hybrid transformer and also voltage conversion ratio of the tapped-inductor buck converter.
23. $m=N_1/N_2$ is current conversion ratio of the hybrid transformer during the OFF-time interval.

BRIEF DESCRIPTION OF THE DRAWINGS

FIG. 3a shows the prior-art tapped-inductor buck converter, FIG. 3b shows the duty ratio control of the switch S in the converter of FIG. 3a and FIG. 3c shows the voltage waveform of the primary of the hybrid transformer.

FIG. 4a shows the family of the DC voltage gains for different turns ratio n of tapped-inductor buck converter in FIG. 3a, FIG. 4b shows the converter model with the leakage inductor of the tapped inductor included, and FIG. 4c illustrates the resulting voltage spike.

FIG. 5a illustrates the input current of the converter in FIG. 3a for $N_1=N_2$ and FIG. 5b shows the output current of the converter in FIG. 3a for $N_1=N_2$.

FIG. 6a shows a first embodiment of the present invention and FIG. 6b shows the state of the two controllable switches for the converter of FIG. 6a.

FIG. 13a illustrates a voltage waveform across the N turns of the hybrid transformer of the converter in FIG. 6a, and FIG. 13b shows the resonant capacitor voltage of the converter in FIG. 6a and FIG. 13c shows the resonant inductor current $i_r$ of the converter in FIG. 6a.

FIG. 25b shows the practical MOSFET transistor implementations along with corresponding high side driver and direct drive for converter of FIG. 25a.

FIG. 27c shows the resonant capacitor current waveform of the converter in FIG. 25a.

PRIOR-ART

Prior-art Buck Converter

Figure 1A:
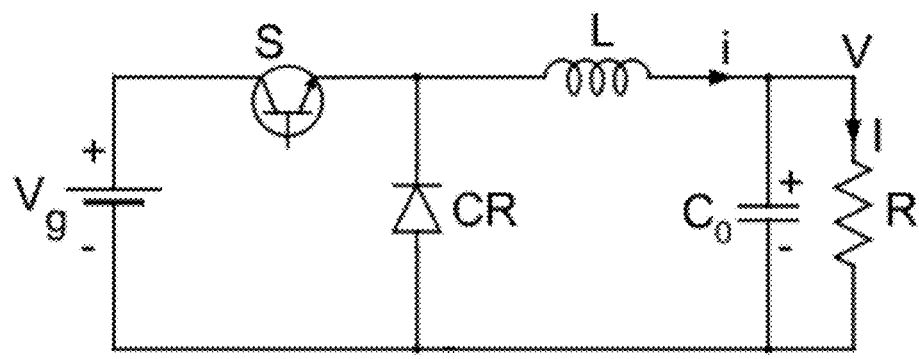
FIG. 1a illustrates a prior-art buck converter.
Figure 1B:
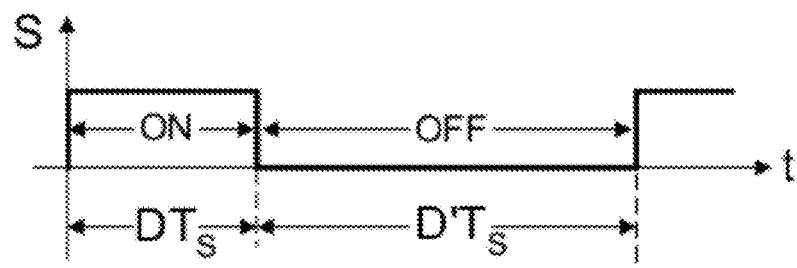
FIG. 1b illustrates the duty ratio control of the switch S of FIG. 1a, and FIG. 1c shows the graph of the DC voltage gain as a function of duty ratio D.

The non-isolated prior-art Pulse Width Modulated (PWM) buck switching converter shown in FIG. 1a consists of two complementary switches: when S is ON, CR is OFF and vice versa (in continuous conduction mode) as shown by the switch states in FIG. 1b. It is capable of step-down only of the input DC voltage dependent of operating duty ratio D, which is the ratio of the ON-time of switch S and switching period $T_S$.

Figure 1C:
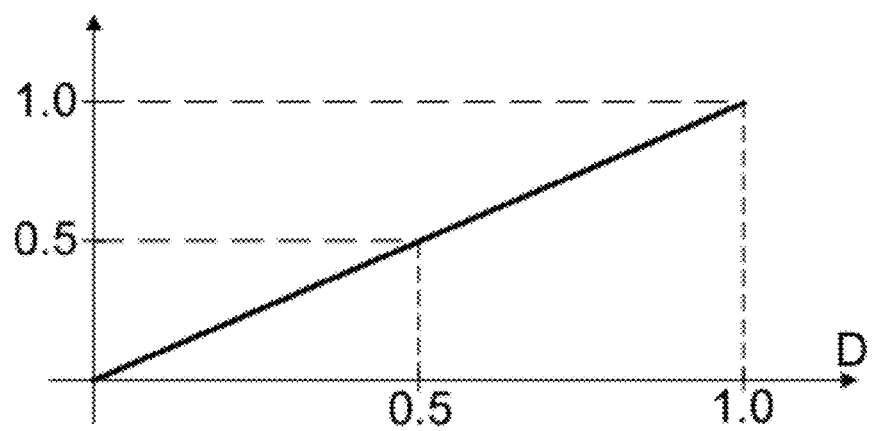

The minimum implementation of semiconductor switches in buck converter is shown on FIG. 1a where switch S is a bipolar transistor and switch CR is a current rectifier. The linear step-down DC gain characteristic of the buck converter as a function of duty ratio D is illustrated in FIG. 1c and given by:

$$V/V_g=D \qquad (1)$$

There are three fundamental problems associated with the buck converter when it is required to operate at a large step-down conversion ratios such as 12:1 and 24:1 as needed for modern microprocessors requiring 1V or 0.5V voltage from a 12V input source:

1. Duty ratio is very small at 1/12 for 1V and ultimately 1/24 for 0.5V output. This coupled with typical 1 MHz switching frequencies used in many present converters leaves less than 40 nanoseconds of the ON-time and severally limits its operation. (FIG. 2a)
2. The input switch is turned-OFF at a peak current even higher than the DC load current (FIG. 2a) resulting in high turn-OFF losses of the main input switch S with severe degradation of efficiency.
3. Inductor size is negatively impacted as the inductor operates near maximum ac flux region at point A in FIG. 2b, which illustrates the inductor ac flux reduction with duty ratio increase. For example, if the converter were able to operate at 2/3 duty ratio at point B in FIG. 2b, the inductor ac flux will be reduced 3 times and inductor size proportionally reduced three times.

Some of these problems are alleviated in the prior-art tapped-inductor buck converter, but new problems seriously effecting efficiency are introduced as described next.

Prior-art Tapped-Inductor Buck Converter

In order to solve the problem of the prior-art buck converter which must operate at 4% duty ratio to achieve the large 24:1 step-down conversion needed, a prior-art tapped-inductor buck converter of FIG. 3a and its duty ratio controlled switch as defined in FIG. 3b is offered as an alternative.

The following definition of the tapped-inductor in FIG. 3a is made:

Turns $N_1$ and $N_2$ of the tapped-inductor and their dot connections are made with reference to their designations in FIG. 3a so that:

$$N=N_1+N_2 \qquad (2)$$

wherein N is an integer number for primary number of turns of the tapped-inductor and $N_2$ is another integer number for number of turns of the secondary of the tapped-inductor. Note that this makes $N_2$ turns common to both primary and secondary windings. Note also when switch S is turned-OFF there is no current in $N_1$ turns and the inductive energy stored in the tapped-inductor magnetizing inductance during ON-time interval is released to the load during OFF-time interval.

In special applications requiring large step-down and low output voltage, the small size of tapped-inductor indicates that the secondary winding turns $N_2$ can be reduced just to one turn:

$$N_2=1 \qquad (3)$$

so that the turns ratio n can now be defined as:

$$n=N/N_2=N \qquad (4)$$

We will use this turns ratio n as parameters in subsequent analysis and comparisons. However, the turns $N_1$ and $N_2$ will also be invoked at some instances, where the reference is needed to particular windings to refer to the current flowing through them or voltage across them.

The voltage waveform on the primary side of the tapped-inductor with N turns as defined in FIG. 3a and with respect to dot connection designated also in FIG. 3a, is illustrated in FIG. 3c for a general case of tapped-inductor step-down ratio "n". By applying the volt-second balance using voltage waveform in FIG. 3c, the DC voltage gain is obtained as follows:

$$V_g DT_S = Vn(1-D)T_S \qquad (5)$$

$$M=V/V_g=D/(n-nD+D) \qquad (6)$$

where M is a DC voltage gain as a function of the duty ratio D and the turns ratio "n". The family of the DC voltage gains for increasing values of integer value "n" from 1, 2, 3, 4 etc. is shown by graphs in FIG. 4a. Note that for n=1, tapped-inductor buck converter reduces to an ordinary single inductor buck (FIG. 1a) and therefore has a usual linear DC gain function shown in dotted line in FIG. 4a. Tapped-inductor buck converter does result in reduction of the output DC voltage compared to ordinary buck converter for the same duty ratio D. It also reduces the voltage stress on the diode rectifier CR, by the turns ratio of the autotransformer. This results in reduced area of the silicon needed for implementation of this switch in planar technology as a synchronous rectifier MOSFET switching device.

However, all of these advantages are far outweighed by the fundamental problem associated with this converter topology. The practical tapped-inductor does have associated with it a leakage inductance $L_1$, which is illustrated in the tapped-inductor model of FIG. 4b as a lumped external inductance $L_1$ in series with the primary winding. During the ON-time interval when switch S is turned-ON, the energy stored in this inductance is given by:

$$E=\tfrac{1}{2}L_1 I_p^2 \qquad (7)$$

$$P_1=Ef_S \qquad (8)$$

Where $I_p$ is the primary current at the instant of the turn-OFF of the main switch S and $P_1$ is corresponding power loss, which is proportional to switching frequency. This will clearly reduce efficiency significantly and prevent increase of the switching frequency in order to reduce the size of the tapped-inductor. As the present buck converters designed for Voltage Regulator Modules for 12V to 1V conversion already operate at 1 MHz switching frequency, this limitation is the main reason that tapped-inductor buck is rarely if at all used.

In addition to above power loss, the additional problem is also seen in FIG. 4b. When the switch S is turned-OFF, the stored energy in leakage inductance does not have a current path to discharge that stored energy during OFF time of switch S as seen in FIG. 4b. This will lead to a large voltage spike $v_A$ illustrated in FIG. 4c. This energy therefore must be dissipated by use of the dissipative snubbers, which can only reduce the magnitude of spike but cannot eliminate it entirely. This in turn, requires a higher voltage rated devices, etc.

The tapped-inductor therefore does provide an additional step-down in voltage conversion ratio from primary to secondary winding as per (6), but it also produces at a transition point an unwanted jump in instantaneous current during the transition form ON-time interval to OFF-time interval as seen in waveforms of the input current (FIG. 5a) and the output current (FIG. 5b). Note in particular the 2:1 step-up in the load current at the end of ON-time interval which is obtained for n=2 as illustrated in FIG. 5b for duty ratio D=0.5. Clearly for n=4 there will be a factor of 4 times jump in current. Hence the larger the step-down turns ratio n of the tapped-inductor, the bigger is the jump in current and more severe is the leakage inductance loss problem.

It is also obvious that adding a separate external inductor $L_r$ in series with the primary of the tapped-inductor would magnify the power loss problem by an even larger magnitude directly proportional to the size of the external inductor.

Summary of the Invention

Figure 6A:
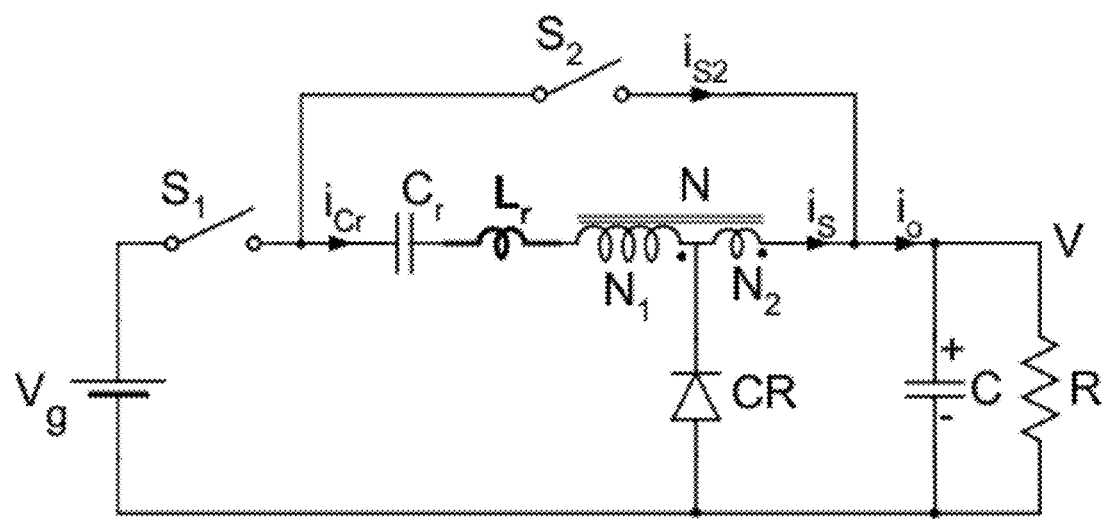

Basic Operation of the Hybrid-Switching Step-down Converter with a Hybrid Transformer The present invention, however, does exactly that, as seen in FIG. 6a where the external resonant inductor $L_r$ is added to the primary of the tapped-inductor. However, in the converter of FIG. 6a, another switch $S_2$ is provided, which provides the current path for the energy stored in this inductor during ON-time interval to be released to the output during the OFF-time interval.

Furthermore, this discharge is not abrupt but smooth, as the resonant capacitor $C_r$ is provided in series with the resonant inductor to provide such a smooth and continuous discharge path. Even a small leakage inductance was a big problem in the prior-art tapped-inductor buck converter. The large resonant inductor at the same position in the present invention is, however, a part of the solution, which does not dissipate the energy stored on this inductance, but instead sends it to the load in a non-dissipative way as will be explained in the later section.

Figure 6B:
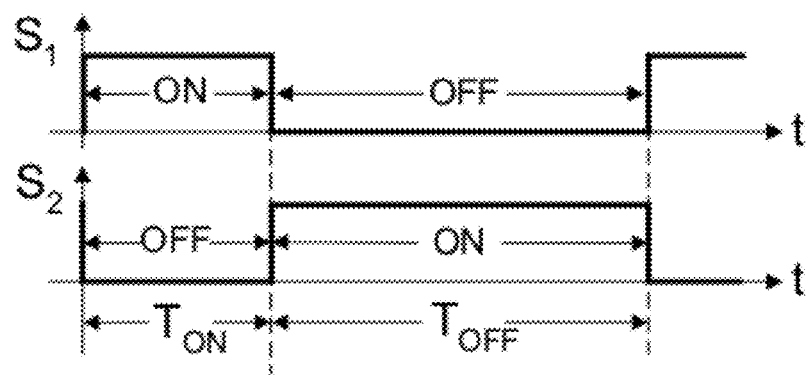

The present invention is, therefore, shown in FIG. 6a in its basic form with two ideal active switches first switch $S_1$ and second switch $S_2$ operating out of phase as in state-diagram of FIG. 6b and a current rectifier CR connected to the common point between the $N_1$ turns and $N_2$ turns of the hybrid transformer with the direction of magnetic coupling illustrated by the dot markings on the respective windings. A resonant capacitor $C_r$ is connected on one side to the main switch $S_1$ and on the other side to the resonant inductor $L_r$. The other side of the resonant inductor is connected to $N_1$ winding, while the other end of $N_2$ winding is connected to the load. Finally, a second switch $S_2$ is connected on one side to the common point between first switch $S_1$ and the resonant capacitor and on the other side to the load.

We now define another turn's ratio m, the current conversion ratio of the hybrid transformer as:

$$m=N_1/N_2 \qquad (9)$$

which has an additional role of amplifying the capacitor resonant discharge current by this turns ratio and deliver it via hybrid transformer secondary turns $N_2$ to the load during the OFF-time interval.

Figure 7A:
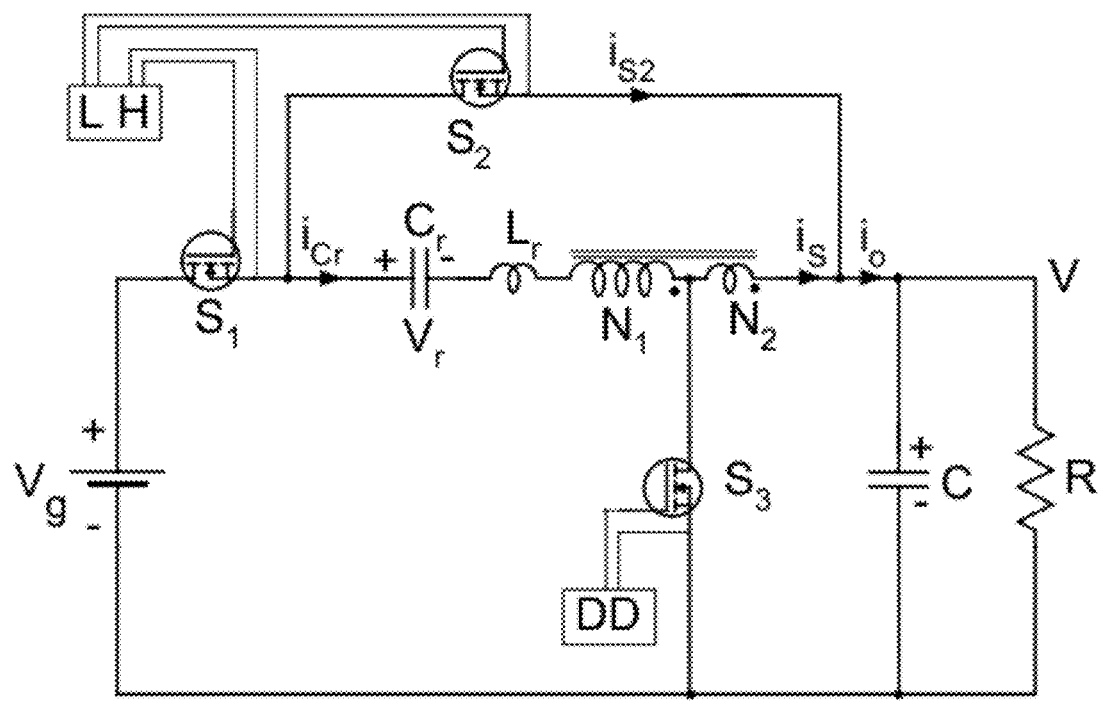
FIG. 7a illustrates an all MOSFET implementation for the three switches of the converter in FIG. 6a and FIG. 7b shows the state of all three switches.
Figure 7B:
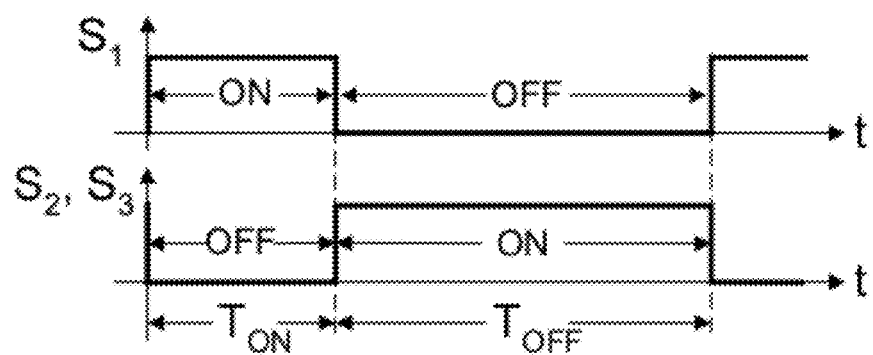

For low voltage applications an all n-channel MOSFET implementation shown in FIG. 7a is desirable in which the current rectifier CR is replaced with the MOSFET switch $S_3$ operated as a synchronous rectifier to reduce conduction losses at low voltage outputs as per state-diagrams shown in FIG. 7b. Note also a convenient Direct-Drive (DD) applied to switch $S_3$ due to its grounded source position. This is of practical importance, as it will be shown later that this switch will have by far the highest rms current of all three switches for large step-down conversion, so that direct drive is a distinct advantage for this switch.

The other two switches $S_1$ and $S_2$ will in comparison have much-reduced rms currents. Note also their desirable connection, so that as seen in FIG. 7a a high side driver LH could be used referenced to the output low voltage of 1V, so that $S_2$ switch is low side switch and $S_1$ switch is considered as a high side switch. As the subsequent analyses will show, the voltage on the resonant inductor Lr is also rather low, so that high side driver could be implemented in a straightforward way. Thus, this already resolves one of the problems of the prior-art tapped-inductor buck converter having the main switch floating and thus requiring isolated or other complex drives schemes.

The switching topology of FIG. 7a features a rather unorthodox configuration consisting of three switches, a resonant capacitor $C_r$ and a resonant inductor $L_r$ together with a hybrid transformer. The state of the three switches is shown in FIG. 7b confirming that the converter operates with just two switching intervals: ON-time interval $T_{ON}$ and OFF-time interval $T_{OFF}$ within a single switching cycle $T_S$.

Such a configuration with three switches is not possible in conventional square-wave PWM and conventional true resonant switching converters (1,2,5). However, here it is essential for its operation and is made possible by the new hybrid-switching method, which uses a unique combination of the square-wave switching and resonant switching.

The switching topology of FIG. 7a has another unorthodox feature not possible in prior-art converters. In addition to the hybrid transformer connected to the load, this converter also has a separate resonant inductor $L_r$ connected in series with the resonant capacitor and on the primary side of hybrid transformer. Conventional square-wave converters explicitly forbid such a placement of the inductor for apparently obvious reason: the inductor current cannot be interrupted as it will develop a huge voltage spike across inductor and result in large voltage exceeding rating of the switch and hence in its destruction as described earlier for tapped-inductor buck converter. The following detailed analysis will, however, show that the converter topology of the present invention and its operation not only permit such placement of the inductor $L_r$ but is also crucial for the operation of the converter in FIG. 6a and its many advantages.

However, crucial to the present invention of FIG. 6a and FIG. 7a is the understanding of the operation of the two windings $N_1$ and $N_2$ coupled magnetically on the common magnetic structure as designated on FIG. 6a and FIG. 7a with the double line indicating the magnetic coupling. Thus, the different types of magnetic coupling are reviewed first in order to explain the operation of the two winding magnetic structure of the present invention. The different type of two winding magnetic structures will be discussed with reference to the flux density B versus magnetic flux intensity H characteristics as used in different two winding magnetics structures described next.

Two Windings Coupled on the Common Magnetic Core

Although it appears that the two windings coupled on the common magnetic core could have one and only one interpretation, this is not the case as the following analysis of the presently known two winding magnetic structures are reviewed. This will also serve as the definition of the terms, which will be from here on used in describing the magnetic structure used in the present invention.

Transformer and Autotransformers in General

Faraday discovered in 1831 a principle of magnetic induction of two windings and was therefore also the inventor of the transformer used today commonly in utility AC line power transmission. The transformer, as discovered by Faraday, is a magnetic device, which does not store energy, except for the very small fraction of the input current (1% or less) circulating in transformer magnetizing inductance which is needed to establish the magnetic flux in the core and enable instantaneous transfer of the input ac power to output ac power. As there is no energy stored, the magnetic core coupling the two windings is made of high permeability magnetic material and has no air-gap thus resulting in high magnetizing inductance and low magnetizing current.

Such transformer is also capable via winding turns ratio to step-up or step-down the input ac voltage. It also provides a galvanic isolation between primary and secondary windings important for safety protection from the high voltage primary potential. An autotransformer connection can be used when galvanic isolation is not needed in which case the primary and secondary winding have one common terminal. The other terminal of the secondary winding is then provided as a tap on the primary winding. Note that we will for this case reserve the autotransformer name to indicate a magnetic structure with no energy storage.

Figure 8:
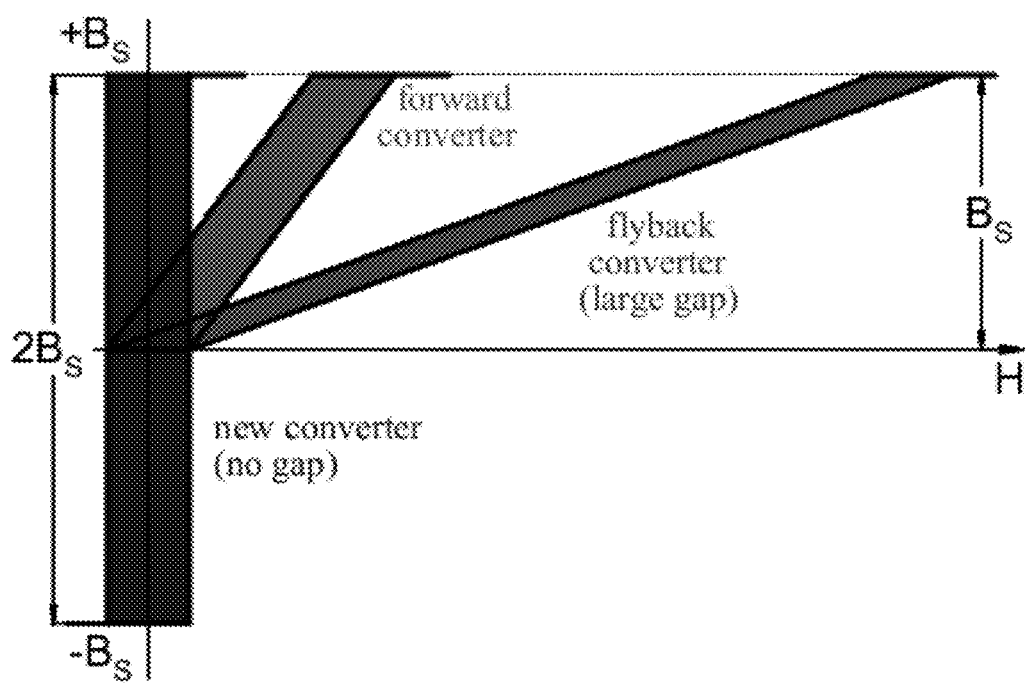
FIG. 8 shows the comparison of the operating BH loops of the transformers used in Ćuk converter (marked new converter) and in conventional forward and flyback converters.

Therefore, these true ac transformers and autotransformers operate with bi-directional magnetic flux and corresponding bi-directional magnetic flux density B as shown in FIG. 8c by the BH loop with positive and negative magnetic flux densities.

Transformers as used in Switching Converters
Ćuk-type Transformer and Bridge-type Transformers In switching converters, the transformers with such bi-directional flux capabilities and BH loop also exist, such as the transformer in the Ćuk converter (single ended transformer) which is designated as new converter in the FIG. 8c and the transformers in bridge type converters (bridge-type excited) and therefore these transformers have the attributes of the ac transformers discussed above.

Forward Converter Transformer Type

Another transformer utilized in the well known forward converter also has no DC bias and no stored energy but falls short of the above described ac transformer, as it utilizes only one half of the core flux capability as illustrated in FIG. 8c with BH loop for the forward converter transformer. In this type of the transformer the power is transferred during only one part of the switching period (ON-time) so that the net ampere-turns during ON-time interval are still zero (no energy storage and no air-gap needed in the magnetic core). However, as the magnetizing inductance current flow would be interrupted at the end of ON-time interval, this type of the transformer requires an additional means to reset the core flux to the origin, through a reset winding, which provides the path for the uninterrupted flow of the magnetizing current. Alternatively, a voltage clamp is also used for that purpose.

Flyback Transformer Type

Unfortunately, in switching converters, the magnetic structure used in the flyback converter is also commonly called a transformer, even though it does not meet the fundamental feature of the transformer of not storing the energy. To the contrary, this type of magnetic structure actually stores the inductive energy in the in magnetizing inductance of the transformer during ON-time interval and then releases the stored inductive energy during the subsequent OFF-time interval. Therefore, the magnetic core must have an air-gap to store that energy and prevent the saturation of the core flux due to the DC-bias of the core, as illustrated in FIG. 8c for the flyback type of the "transformer". This flyback "transformer" type has only the galvanic isolation and step-up or step-down feature of the transformer but lacks the fundamental no energy storage feature of the true ac transformer.

Tapped-Inductor Type

We have already seen this tapped-inductor structure in the tapped-inductor buck converter. The tapped-inductor, is in-fact, just a variant of the flyback "transformer" as it also stores all the inductive energy in the magnetizing inductance during ON-time interval and releases it to the load during the OFF-time interval with the only difference being that it lacks the isolation feature since part of the winding is common to both primary and secondary windings. Thus, tapped-inductor could also be designated as a flyback "autotransformer", to signify the lack of isolation feature.

Coupled-Inductor Magnetic Structure

In some switching converters, such as Ćuk converter (1), the separate inductors have identical AC voltage excitation, so that the inductors could be coupled on the common magnetic core (1) resulting in two switching converter variants: one with the separate inductors and another with coupled-inductors with either converters being operational but with coupled-inductors bringing additional performance benefits. Note, therefore, the key difference with tapped-inductor magnetic structure as used in switching converters. For example, the tapped-inductor buck converter of FIG. 3a could not operate if two separate inductors replace the tapped-inductor.

In most current applications the coupled-inductor structure results in the DC storage of two separate inductors added together resulting in the need for a gapped core. However, it is also possible to find the coupled-inductor structures in which DC ampere turns excitations of the two inductors cancel after magnetic coupling resulting in no DC energy storage and hence in a true ac transformer-like structure with no air-gap needed for storage. Such a transformer despite the DC bias in each separate inductor could be described through coupled inductor equations modeling the ac transformer.

Hybrid Transformer

In the switching converters it is possible to have a two-winding magnetic structure such as the one in the converter of FIG. 6a in which the two types of energy transfers are employed simultaneously such as:
a) Tapped-inductor energy transfer
b) AC transformer energy transfer This is a consequence of the fact that the converter of FIG. 6a employs two separate energy storage and transfer mechanisms:
a) inductive energy storage is transferred from input to output via a tapped-inductor with N primary winding turns and $N_2$ secondary winding turns (turns ratio n) resulting in the inductive energy storage and respective DC-bias as in a tapped-inductor buck converter.
b) capacitive energy discharge of the resonant capacitor $C_r$ during the OFF-time interval and in a transformer-like manner amplifying the capacitor resonant discharge current to secondary of the hybrid transformer by a turns ratio m and delivering it to load. Note also the respective directions of the actual resonant currents in the primary winding (into the dot marked terminal) and secondary winding (out of the dot terminal) which results in the sum of ampere turns of the two windings being equal in magnitude but opposite in sign, hence in net zero ampere turns. This confirms no energy storage for this resonant current transfer through the hybrid transformer.

Clearly, this combined inductive and capacitive energy storage and transfer ultimately result in the energy storage of the hybrid transformer of FIG. 6a and therefore the need to provide the air-gap for the inductive part of the total energy transfer. Clearly, as the capacitive energy transfer did not contribute to the DC bias, but did contribute to the DC load substantially (even 50% of total DC load current load current for some duty ratio), the net DC storage in this converter will be smaller than in the buck converter and tapped-inductor buck converter resulting in smaller size magnetics.

An alternative way to calculate the net DC bias is to observe that the primary winding $N_1$ is DC blocked by resonant capacitor $C_r$ whose charge balance demands that the net DC current flowing into $N_1$ winding is zero, hence no DC bias is generated from the primary $N_1$ winding. Thus, all the DC bias is coming from the secondary $N_2$ turn winding and the respective total current in that winding during the OFF-time interval.

Because the two winding structure operates partly as a tapped-inductor (for inductive current flow) and partly as a transformer (for capacitive discharge resonant current) this two winding structure is designated as a hybrid transformer.

Combined Capacitive and Inductive Storage and Transfer

The converter of FIG. 6a will results in two distinct switching networks, one for ON-time charge interval (FIG. 9a) and another for OFF-time discharge interval (FIG. 9b) so that:
a) Charge interval $T_{ON}$: The source current is during this ON-time interval performing three tasks simultaneously: charging the resonant capacitor $C_r$ and storing capacitive energy on it, storing the inductive energy in the magnetizing inductance of the hybrid transformer and delivering the capacitive charging current to the load.
b) Discharge interval $T_{OFF}$: During this interval two discharges take place, inductive discharge of the stored inductive energy in the previous ON-time interval and capacitive discharge of the energy stored during ON-time interval on the resonant capacitor $C_r$.

The energy in previous ON-time interval is during this OFF-time interval being released to the load through two different charge transfer paths as described below.

Figure 9A:
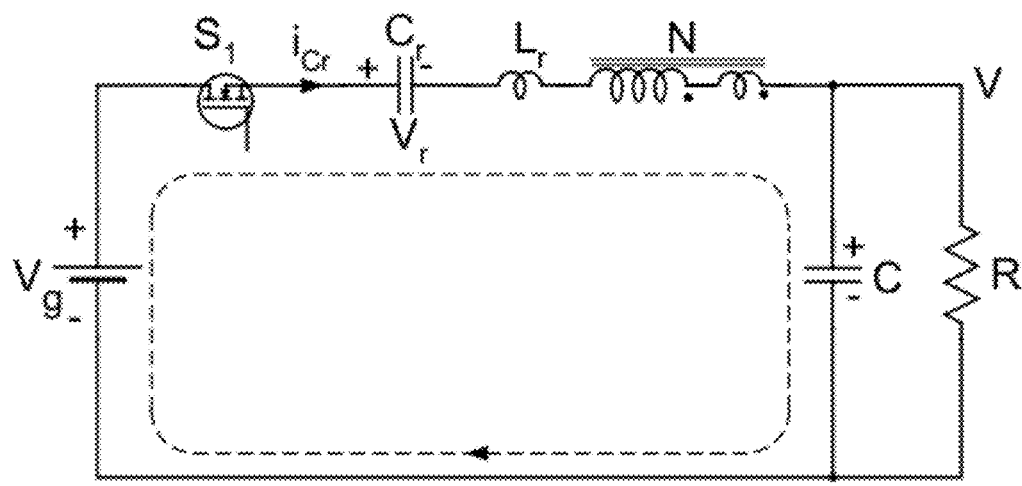
FIG. 9a illustrates a linear switched network for converter of FIG. 6a for ON-time interval $DT_S$ and FIG. 9b illustrates the linear switched networks for converter of FIG. 6a for OFF-time interval $(1-D)T_S$.
Figure 9B:
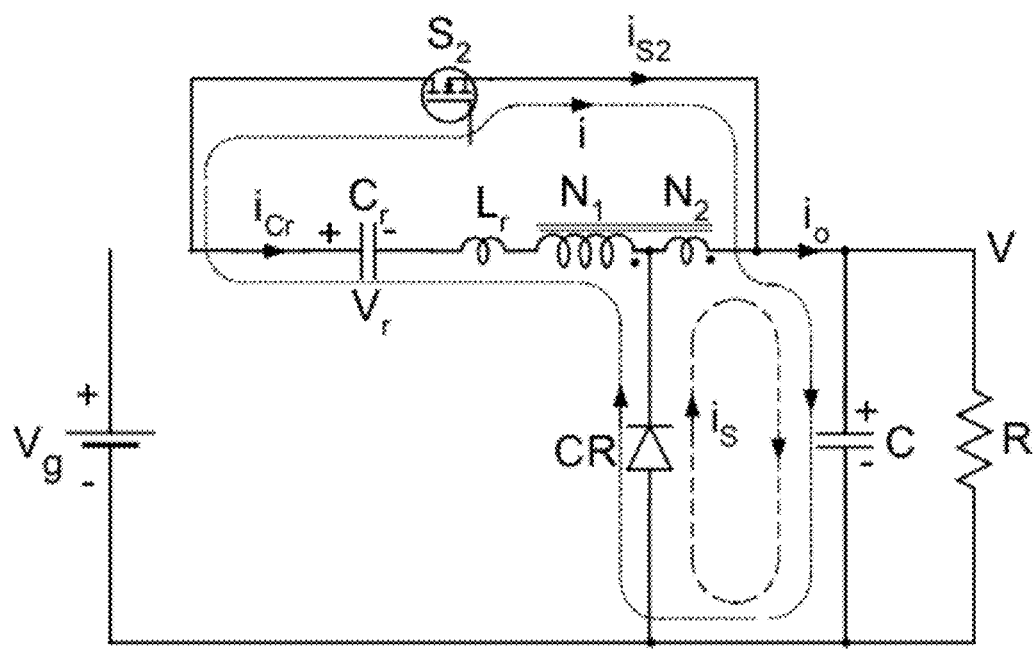
Figure 10A:
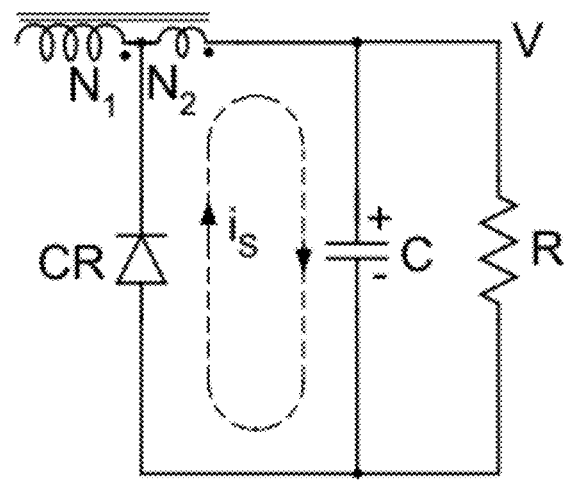
FIG. 10a illustrates one equivalent linear circuit model for linear switched network of FIG. 9b
Figure 10B:
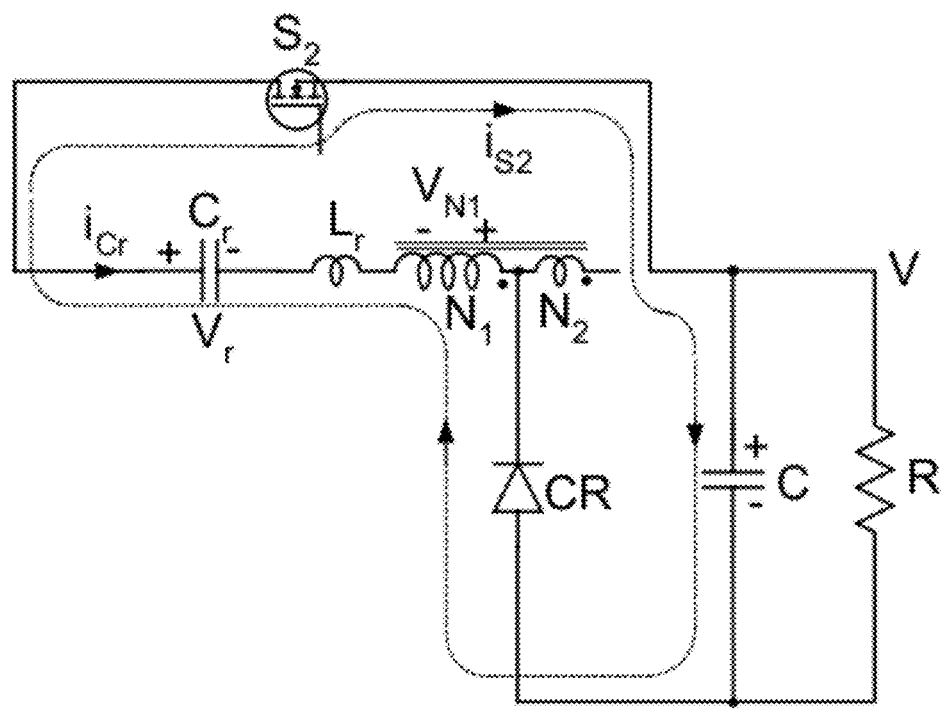
FIG. 10b illustrates the other equivalent linear circuit model for linear switched network of FIG. 9b.

By the principle of linear superposition, the equivalent circuit model for discharge interval of FIG. 9b can, in turn, be broken into two separate equivalent circuit models:
a) Hybrid-transformer secondary current $i_S$ discharge into the load (FIG. 10a)
b) Second Switch $S_2$ current discharge into the load (FIG. 10b).

From FIG. 9a during the ON-time interval both tapped-inductor (full primary winding N) and the resonant capacitor $C_r$ are storing the energy from input source and simultaneously providing the same source current to the load.

From FIG. 9b it is apparent how during the OFF-time interval, hybrid transformer is releasing its previously stored energy through its $N_2$ secondary turns to the load. The second switch $S_2$ provides a part of the load current due to the direct connection to the load terminal. For example for n=2 and D=0.5, 20% of the load current is provided by this current path and the other 80% of the load current is provided through the transfer via hybrid transformer with 40% of the load contributed by the inductive energy transfer and the other 40% of the load current contributed by the capacitive energy transfer through the current multiplication of the hybrid transformer from its primary to secondary.

This results in the first basic relationship of the present invention, that the output current $i_0$ is the sum of the resonant inductor current $i_r$ and the hybrid transformer secondary current $i_S$, which are designated in FIG. 7a, that is:

$$i_0 = i_{S2} + i_S \qquad (10)$$

Therefore, the load current is being supplied with the current during both parts of the switching interval, the ON-time interval and OFF-time interval. The conventional tapped-inductor buck converter supplies the load with the inductive energy storage and transfer only, since there is no capacitive energy storage and transfer. The present invention, on the other hand, supplies to the load an additional current based on the capacitive energy storage and transfer via hybrid transformer action. This results in a fundamentally much more effective power transfer based on combined inductive and capacitive energy storage and transfer working together and in synchronism during two switching subintervals. It is important that the resonant capacitor charge current is never wasted, as it is delivered to the load during the ON-time interval, and via hybrid transformer also discharged to the load. In the process, the energy stored on the resonant inductor is never lost but, just the opposite, completely delivered to the load, as shown in later section on experimental verification.

The load current during the OFF-time interval $T_{OFF}$ (FIG. 9b) consists of three components:

a) Inductive energy discharge through secondary winding of hybrid transformer.

b) Resonant discharge current of the resonant capacitor amplified by transformer turns ratio m and delivered to the load via hybrid transformer secondary. Note that this part was missing in the tapped-inductor buck converter.

c) Direct contribution of the resonant inductor current to the load. Note that this part is also missing in the tapped-inductor buck converter.

Figure 11A:
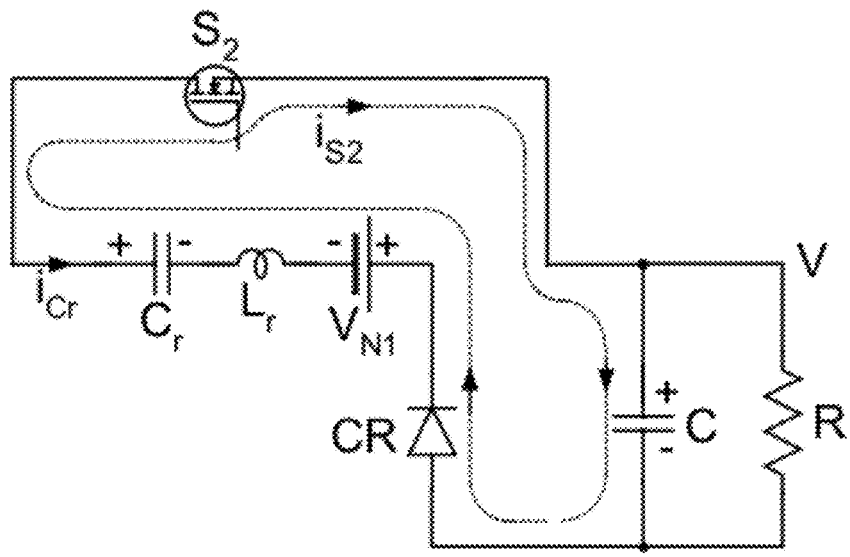
FIG. 11a illustrates simplified circuit model of FIG. 10b in which $N_1$ winding is replaced with a voltage source $V_{N1}$.
Figure 11B:
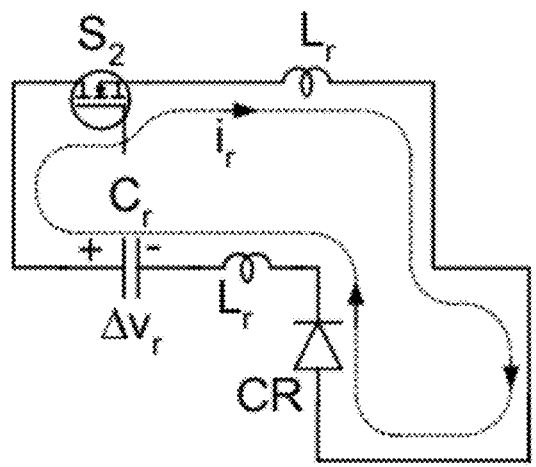
FIG. 11b illustrates an ac circuit model of FIG. 10b in which DC components are eliminated.
Figure 11C:
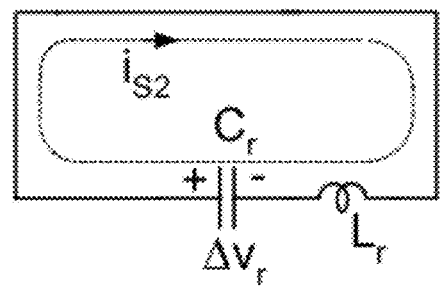
FIG. 11c shows the final linear resonant circuit model of FIG. 10b applicable for OFF-time interval.

We now analyze a series of equivalent circuit models in FIG. 11a, FIG. 11b, and FIG. 11c in order to establish two critical relationships:

a) Steady-state DC voltage V, on the resonant capacitor $C_r$ which will, in turn, lead to determination of the DC voltage gain M and b) Provide explanation for a unique one-half cycle resonant current flow to the load.

From the circuit model in FIG. 10b and assuming a 2:1 step-down ratio n=2, the voltage $V_{N1}$ on $N_1$ winding is equal to output DC voltage V ($V_{N1}$=V), hence resulting in a DC voltage source V with respective polarity as in FIG. 11a. The volt-second balance on the resonant inductor $L_r$ during OFF-time interval then requires that $$\int V_{Cr} dt = V_r - 2V = 0 \qquad (11)$$

since the DC voltage across the resonant inductor voltage must be zero, as the resonant inductor cannot support any DC voltage across it and must be fully flux-balanced during this OFF-time interval. From (11) the summation of DC voltages around the loop in FIG. 11a results in a net zero DC voltage and hence in the equivalent circuit model of FIG. 11b in which the resonant capacitor $C_r$ has only a ripple voltage $\Delta v_r$ on it. In this equivalent circuit model the output capacitor C is shorted since it is much larger than the resonant capacitor $C_r$ as per:

$$C \gg C_r \qquad (12)$$

Finally, the switches are replaced with ideal short circuits to result in the final simple series resonant circuit model of FIG. 11c.

Note that the series connection of the active switch $S_2$ and current rectifier CR is left in the circuit model of FIG. 11b in order to confirm that the resonant current can flow only in one direction, that is, in the direction permitted by the current rectifier CR. Therefore, only a positive half-cycle of the sinusoidal resonant current can flow in the actual converter due to restrictions imposed by the diode rectifier as confirmed in the experimental verification described next.

No Current Jump in the Hybrid Transformer

The placement of an external resonant inductor in series with the primary of the hybrid transformer in the present invention dictates that the primary inductor current must be continuous at the transition from the ON-time interval to the OFF-time interval, since the continuity of the external resonant inductor current dictates so. Note that this is in complete contrast to prior art tapped-inductor case in which operation of the tapped inductor caused the jump in the primary current waveform. The next experiment was designed to verify the elimination of the jump in the primary current of the hybrid transformer and the proof that the resonant inductor energy is not dissipated but instead delivered to the load.

Experimental Verification

The prototype to verify basic qualitative and quantitative operation of the present invention was built with a hybrid transformer turns ratio n=2 and m=1. The input voltage was 24V resulting in 5:1 voltage step-down at 50% duty ratio. Hence expected DC output voltage is 4.8V. The converter was also operated at 3 A DC load current for a 15 W output.

The resonant inductor $L_r$ and resonant capacitor $C_r$ were selected to operate with a resonant period of $T_r$=50 µsec or 20 kHz switching frequency for duty ratio D=0.5. Furthermore, the OFF-time interval is chosen to be fixed and equal to:

$$T_{OFF} = 0.5 T_r, f_r = 1/T_r \qquad (13)$$

This was chosen in order to insure that the half of the resonant period coincides with the OFF-time interval. The variation of the ON-time interval or effectively duty ratio, while keeping the OFF-time interval constant as per (13), is now controlling the output DC voltage.

The measurements were first made when the duty ratio is adjusted to 50% or D=0.5. The experimental waveforms shown in FIG. 12 from top to bottom are:

1) gate drive of the first switch $S_1$.
2) current of the second switch $i_{S2}$
3) secondary current $i_S$ of the hybrid transformer
4) output current $i_0$, of the converter hybrid transformer.
Note as predicted that the primary current of the hybrid transformer does not have any current jump at the transition from ON-time interval to the OFF-time interval. As the hybrid transformer current amplification is m=1, the transformer secondary current has also the same wave shape with no jump in it.

The important question to ask is now: where did the current jump disappear. In fact, this jump would be, indeed present in any other placement of the resonant inductors, such as relocating it to the second switch branch, for example.

The answer is provided by observing that the second switch current $i_{S2}$ does indeed have a negative going jump at the transition from ON-time interval to OFF-time interval. as displayed by the second trace in FIG. 12a. Note also that this jump is exactly equal to the peak input switch $S_1$ current at that transition. The net results are that from (10) the output current must have at that instant zero current level. This is indeed confirmed by the output current shown as the fourth trace in FIG. 12a. Note a perfect half-wave resonant current waveform in output current for OFF-time interval and the linear inductive rise current waveform during ON-time interval. The resonant capacitor will have the same total resonant discharge current but flowing in opposite as it is discharge current for the capacitor but a charge current for the load.

What has taken place is that the second switch current $i_{S2}$ as well as the load current are now absorbing the potential jump in hybrid transformer current waveforms (primary and secondary), which would otherwise be present for different placement of the resonant inductor. Thus, the most unlikely place for resonant inductor, which is on the primary side of the hybrid transformer, turns out to be actual solution, which does indeed eliminate the problem of energy storage and loss due to leakage inductance of the hybrid transformer. The leakage inductance is normally much smaller then the resonant inductor. Thus, one possible alternative application would be to use the leakage inductance of the transformer as the resonant inductor and then adjust the resonant capacitor $C_r$ value appropriately so as to meet the criterion (13).

Figure 12:
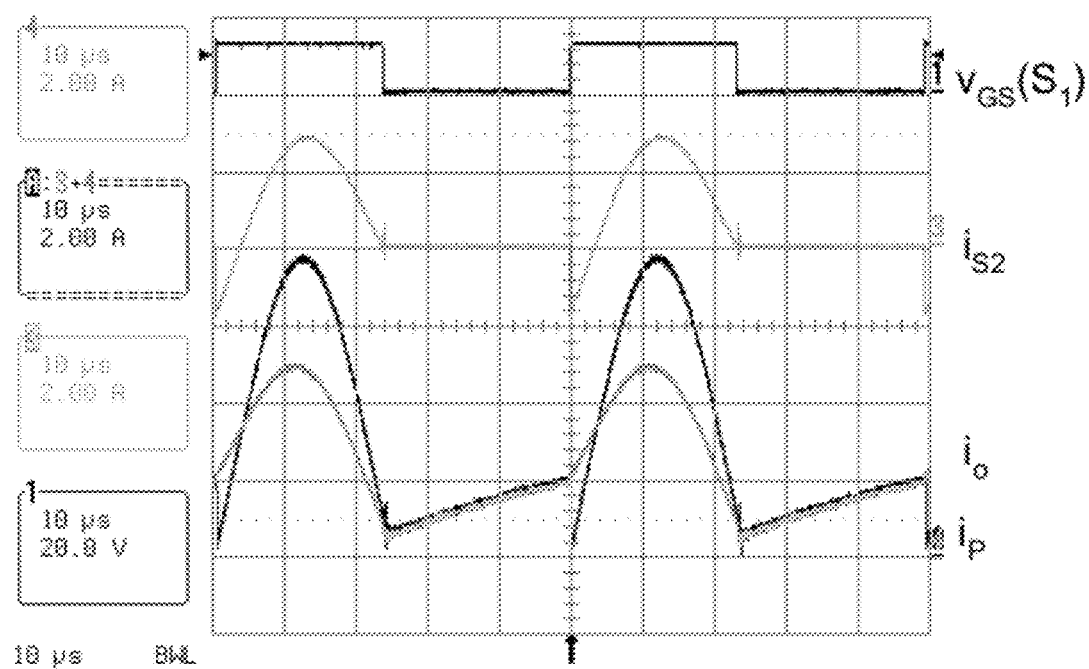
FIG. 12 illustrates the salient waveforms for the converter in FIG. 6a with the traces from top to bottom: a) gate drive of the main switch $S_1$ b) switch current $i_{S2}$, c) primary and secondary current of hybrid transformer and d) output load current.

Note also that the second switch current $i_{S2}$ should be adjusted to be zero at the end of switching interval as shown in FIG. 12. If this current is allowed to go negative that will cause also the load current to go negative, and would only increase the losses. Finally, the second switch current $i_{S2}$ is also flowing in both directions. Therefore, the switch $S_2$ must be implemented as a current bi-directional switch. This is, however, easily accomplished as the MOSFET switch satisfies that requirement.

From the output current waveform, one can easily deduce the current conversion ratio between the output and input. Note that the output current during ON-time interval represents the charge stored on the resonant capacitor. However, through the hybrid transformer action, all this capacitor charge is converted into a resonant discharge current observed on the output during the OFF-time interval, which is four times bigger (2 to 1 increase of the secondary inductive energy transfer to the load and 2 to 1 increase of the capacitive energy transfer to the output). Note that the inductive energy transfer was actually reflected as an additional increase of the resonant load current, which was imposed by the continuity of the primary and secondary hybrid transformer currents due to presence of the resonant inductor on primary side.

The total output current during the whole switching period, is therefore five times bigger then the input current resulting in an effective 5 to 1 voltage step-down. The output voltage was measured as V=4.67V, close to predicted V=4.8V.

The New Hybrid-Switching Method

Figure 13A:
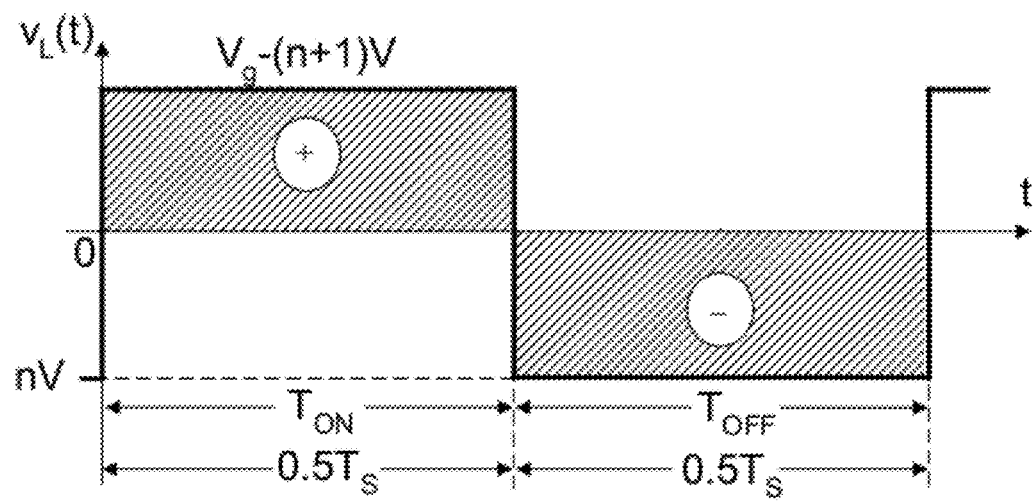
Figure 13B:
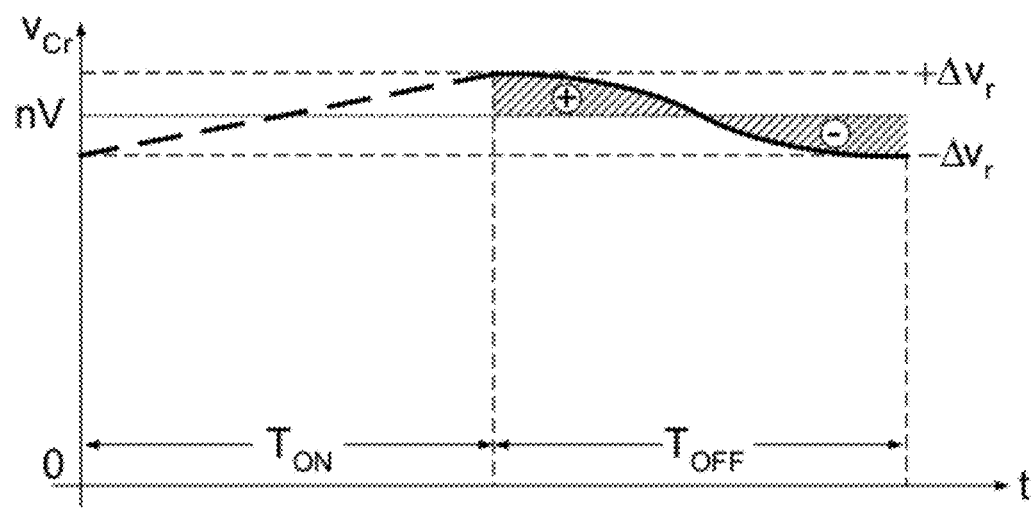
Figure 13C:
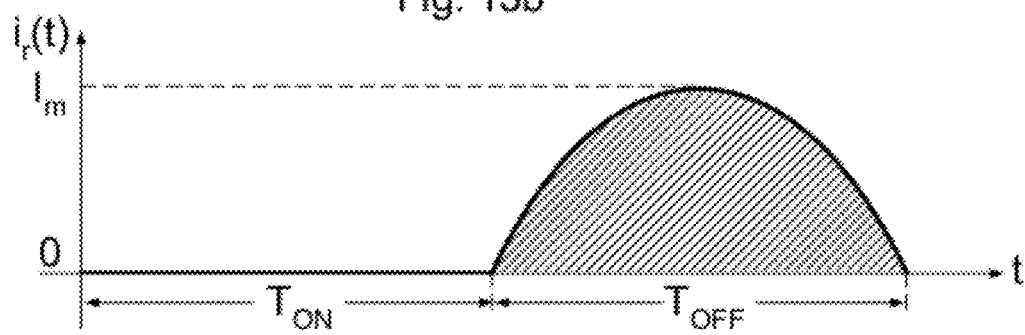

The new hybrid-switching method can now be explained with the reference to FIG. 13a, FIG. 13b and FIG. 13c. From the circuit model in FIG. 9a the voltage waveform on the total winding (across both $N_1$ and $N_2$ windings combined) of the hybrid transformer can be deduced as in FIG. 13a to have a typical waveform associated with the square-wave switching of conventional square-wave PWM converters in which flux (volt-second) balance on inductors and transformers extend over the full switching period $T_S$. However, the other magnetic component, the resonant inductor $L_r$ is fully flux-balanced during the OFF-time interval $T_{OFF}$ only, as seen by the ac ripple voltage on the resonant capacitor $C_r$ displayed in FIG. 13b by the shaded area representing co-sinusoidal ac voltage ripple variation, as the analytical model in later section will confirm.

Finally, the half-sinusoidal resonant inductor current $i_0$ is shown in FIG. 13c during same OFF-time interval. Thus, the OFF-time interval is the interval during which the resonance takes place (per circuit model in FIG. 11c) between the resonant capacitor $C_r$ and resonant inductor $L_r$.

Note that the resonant capacitor $C_r$ plays a dual role as the energy storage and energy transfer capacitor as in regular PWM square-wave converters, such as the Cuk (1,2) and the SEPIC converters (2). However, here capacitor discharge interval is not liner but resonant. For example, during the ON-time interval the resonant capacitor $C_r$ displays the characteristic linearly increasing ac ripple voltage as displayed in FIG. 13b by the dotted lines identical to square-wave switching converters using energy storage and transferring capacitor (1,2). Therefore, the capacitor $C_r$ plays a dual role, that of the regular PWM energy storage and transfer capacitor as in square-wave converters during the ON-time interval when it is charged by a constant current source of the hybrid transformer magnetizing inductance and the resonant discharge role during the OFF-time interval when it is discharged in a resonant fashion by forming a series resonant circuit with the resonant inductor during the OFF-time. The proposed name of hybrid-switching method for this new switching method then reflects this dual nature of the capacitor $C_r$ playing partly a role as in square-wave switching during ON-time interval and resonant role during the OFF-time interval. Clearly, the instantaneous voltage on this capacitor must be continuous at the switching transition resulting in the capacitor ripple voltage at the end of ON-time interval being equal to the ripple voltage at the beginning of the OFF-time interval as illustrated in FIG. 13b.

Another characteristic of this hybrid-switching method not present in any other resonant methods is that despite the clear presence of the resonance, the usual dependence of the DC voltage gain M on resonant component values $L_r$ and $C_r$ as well as on the load current is completely absent and the conversion gain M is dependent on duty ratio D only. From the above it is obvious how in this new hybrid-switching conversion method both capacitive and inductive energy storage and transfers are taking place simultaneously in transferring power from the source to the load using both resonant current and square-wave current switching.

Note the marked difference with respect to the energy transfer in the conventional buck converter of FIG. 1a and tapped-inductor buck converter of FIG. 3a in which there is no capacitive energy storage and transfer and resonance, but only inductive energy storage and transfer, which must take the burden for transferring full load current. As the capacitive energy transfer is much more efficient and in addition much more compact than the inductive energy transfer (see Resonant Analysis Section below), one clearly should expect the significant efficiency improvements and size reduction due to use of both capacitive and inductive energy transfer of the hybrid-switching converter of FIG. 6a.

Evaluation of DC Voltage Gain

We now turn to evaluation of the DC voltage gain first. We assume a duty ratio control D of the main switch $S_1$.

Flux Balance on Two Magnetic Components

First the flux balance on the resonant inductor $L_r$ obtained previously for n=2 case can be now generalized for an arbitrary turns ratio n to:

$$\int V_{Cr} dt = V_r - nV = 0 \quad (14)$$

We then apply the second flux balance criteria, the flux balance on the winding N (equality of the shaded areas in FIG. 13a) to obtain:

$$V_g D - (n+1)VD = nV(1-D) \quad (15)$$

$$M = D/(n+D) \quad (16)$$

Note a remarkable result (16). Despite the presence of the resonance, owing to the hybrid-switching method described above, the DC voltage gain M is only a function of the duty ratio D and the hybrid transformer turns ratio n and is NOT a function of resonant component values nor the load current I. All other prior-art switching methods employing one or more resonant inductors resulted in the heavy dependence on the resonant component values as well as the DC load current. Therefore, the output voltage of the converter in FIG. 6a can be regulated against both input voltage and load current changes employing the same simplicity of the Pulse Width Modulated (PWM) control via duty ratio D.

Up until now, the resonant converters were intrinsically tied to the control and regulation via changing switching frequency relative to the fixed resonant frequency (which spanned the entire switching cycle) so the conventional resonant converters were a-priori excluded from the regulation via PWM duty ratio control. The present invention actually confirms that PWM duty ratio control is not only possible but also advantageous in this new type of hybrid switching converters employing the resonant currents flowing only during a switching subinterval, such as OFF-time interval and not during the entire switching interval as in conventional resonant converters.

Resonant Circuit Analysis
Resonance Equations for OFF-time Interval

In FIG. 13b and FIG. 13c we already anticipated the salient time domain voltage waveforms on the resonant capacitor $C_r$ as consisting of a DC value V, and superimposed ripple voltage with linear increase during the ON-time and co-sinusoidal decrease during the OFF-time with the continuous transition between the two intervals with magnitude of the ripple at the transition instant designated as $\Delta v_r$. The actual time domain of output resonant inductor current $i_r(t)$ is also anticipated in FIG. 13c.

We now undertake to solve the pertinent resonance equations, which will describe analytically such time domain solutions. The derived analytical results could then be used to calculate the component values needed for optimum operation of the converter.

From the resonant circuit model of FIG. 11c, we can now write the resonant equations:

$$L_r di_r/dt = v_r \quad (17)$$

$$C_r dv_r/dt = -i_r \quad (18)$$

whose solutions are:

$$i_r(t) = I_m \sin \omega_r t \quad (19)$$

$$v_r(t) = R_N I_m \cos \omega_r t \quad (20)$$

where $R_N$ is characteristic impedance, $\omega_r$ is radial resonant frequency, $f_r$ resonant frequency and $T_r$ resonant period given by:

$$R_N = \sqrt{L_r/C_r} \quad (21)$$

$$\omega_r = 1/\sqrt{L_r C_r} \quad (22)$$

$$T_r = 1/f_r = 2\pi\sqrt{L_r C_r} \quad (23)$$

Note the importance of the quantity $T_r$. From the equivalent circuit model in FIG. 11c for the converter of FIG. 6a with current rectifier CR, the resonant current $i_r$ has in its path the transistor and a diode connected in series. Such a combination is acting like a composite voltage bi-directional, current unidirectional switch, which can block the voltage of either polarity but conducts the current only in the diode current direction. This large sinusoidal resonant current $i_r$ will only be able to flow in positive directions, as its negative direction is being prevented by unidirectional current property of the diode. This will stop the sinusoidal resonant current flow at zero current level, and allow only a positive half-cycle of the resonant current to flow to the load as illustrated in FIG. 13c as discussed before.

Resonant Inductor Size

Note from the equivalent circuit model of FIG. 11c that the resonant inductor $L_r$ voltage excitation is determined by a small AC ripple voltage $\Delta v_r$ and not large voltage excitations determined by $V_{C_r}$ as seen in FIG. 13b. Therefore AC flux excursions that resonant inductor $L_r$ is subjected to are much smaller by two orders of magnitude than of the hybrid transformer (FIG. 13a) as seen by the comparison of their respective shaded areas. For example, the voltage excursions applied to resonant inductor $L_r$ are limited to only the AC ripple voltage $\Delta v_r$ which is typically 10 times smaller than DC value (10% relative ripple). This is shown in the time-domain waveform of the resonant capacitor $C_r$ on FIG. 13b. This is required by the continuity that instantaneous capacitor voltage must satisfy at the transition point from ON-time interval to OFF-time interval, so that the voltage at the end of ON-time interval must be equal to the voltage at the beginning of OFF-time interval, resulting in same $\Delta v_r$.

As seen from FIG. 13b, the voltage excitation is not only much smaller (see shaded area) and not even square-wave, but instead co-sinusoidal in shape with magnitude $+\Delta v_r$ at the beginning of the OFF-time interval and $-\Delta v_r$ at the end of OFF-time interval resulting in another factor of four of flux and total flux reduction of 40 times. Therefore, the resonant inductor can be 40 times smaller in size than comparable PWM inductor. This will result in the resonant inductor $L_r$ being much smaller than magnetizing inductance of the hybrid transformer and consequently much smaller in size. Nevertheless, despite its small value and small size, the resonant inductor will conduct the sinusoidal resonant current as illustrated in FIG. 13c whose magnitude $I_m$ can be rather large as it is directly related to the DC load current and the operating duty ratio as the next Resonant Circuit model will reveal.

Resonant Capacitor Size

Resonant capacitor size is also rather small and typically comparable to the size of the resonant inductor. This comes as a result of two facts:

1. Current multiplayer chip capacitor has a rather small footprint size (1210 case size) and large ripple current rating of 3 A per single chip capacitor and 47 µF capacitance with 5V voltage rating. Thus paralleling a number of them raises the total current handling capacity to desired level of tens of Amperes.
2. The resonant capacitor at large steps-down ratio handles only a fraction of the load current, such as 25% from the previous experimental example. Note that the output resonant load current $i_0$ has four times more charge than the primary resonant capacitor. Thus, for a 24 A load current only 6 A current capability is needed for resonant capacitor so that two 3 A ripple current rated capacitor in parallel would be sufficient.

Comparison with Tapped-Inductor Buck Converter

The DC voltage gain M (15) can also be expressed in the following form:

$$M = D/n(1+D/n) \leq D/n \quad (24)$$

The conversion gain of $M_i$ of a fully isolated transformer (not autotransformer) converter type would be expected to result in conversion gain $M_i$ given by:

$$M_i = D/n \quad (25)$$

Thus, the voltage gain M of the present invention with hybrid transformer and step-down ratio n results in higher step-down conversion ratio than could be expected of the isolated converter types, such as the conventional forward converter type for example, with conversion gain (25). This is clearly attributed to the presence of the capacitive energy transfer, hybrid resonant switching, and the resonant current contribution to the load as per (9).

Figure 14A:
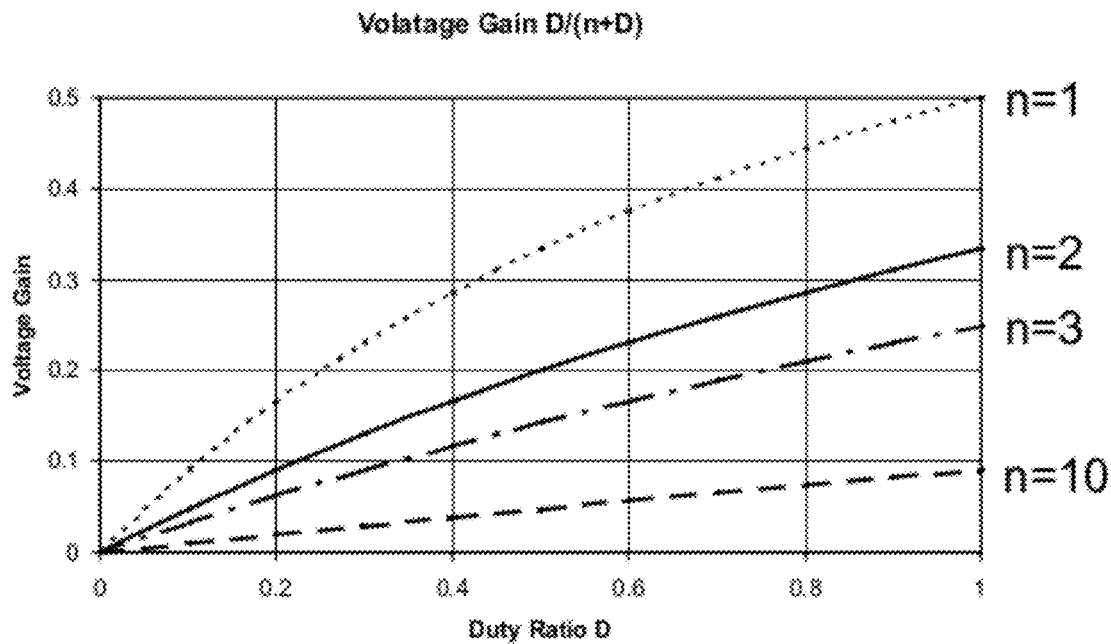
FIG. 14a shows the family of DC voltage gain characteristics for different hybrid transformer turns ratio's n in the converter of FIG. 6a and FIG. 14b compares the DC voltage gains of the converters in FIG. 3a for n=4 and converter in FIG. 6a for n=2.

The family of the DC voltage gains M with turn's ratio n as a parameter are displayed in the graphs of FIG. 14a. The family of curves for tapped-inductor buck (FIG. 4b) for increasing turns ratio n go through the same point, gain M=1 for duty ratio D=1 showing a little additional conversion gain for n larger than 2. On the other hand, the family of the curves for the present invention of FIG. 6a have a DC conversion gains M which are for D=1 proportionally reduced thus resulting in much larger additional conversion ratio reduction with increased turns ratio n as seen in graphs of FIG. 14a. Note also that the case of n=1 reduces hybrid transformer to a single inductor and is shown by the dotted line in FIG. 14a.

From the comparison of two families of curves it is also clear that the present invention provides for the same duty ratios the significantly larger step-down conversion ratios than tapped-inductor buck. For example, for D=0.5 and n=2 the tapped-inductor conversion ratio is 3 while for present invention conversion ratio is 5. At duty ratio D=2/3 and for n=2, the present invention results in four times reduction of the input voltage compared to two times reduction of the tapped-inductor buck, thus a factor of two higher reduction at the same duty ratio and for same turns ratio n=2. Hence 12V input would be reduced to quite low 3V output voltage with present invention while it would result in 6V output with tapped-inductor buck converter. This is clearly attributed to the presence of the capacitive energy transfer and resonance via the hybrid-switching method. Comparison with the ordinary buck converter leads to even larger reduction factor of 8/3=2.67 so 12V would result in 8V output voltage in ordinary buck converter operated at 2/3-duty ratio. Note that 8/3 higher conversion ratios over the buck converter is achieved by addition of only a single turn to make a two winding hybrid transformer compared to a single turn inductor in buck converter. The DC-bias of the buck converter with single turn is actually higher than the DC bias of the hybrid transformer.

Figure 2A:
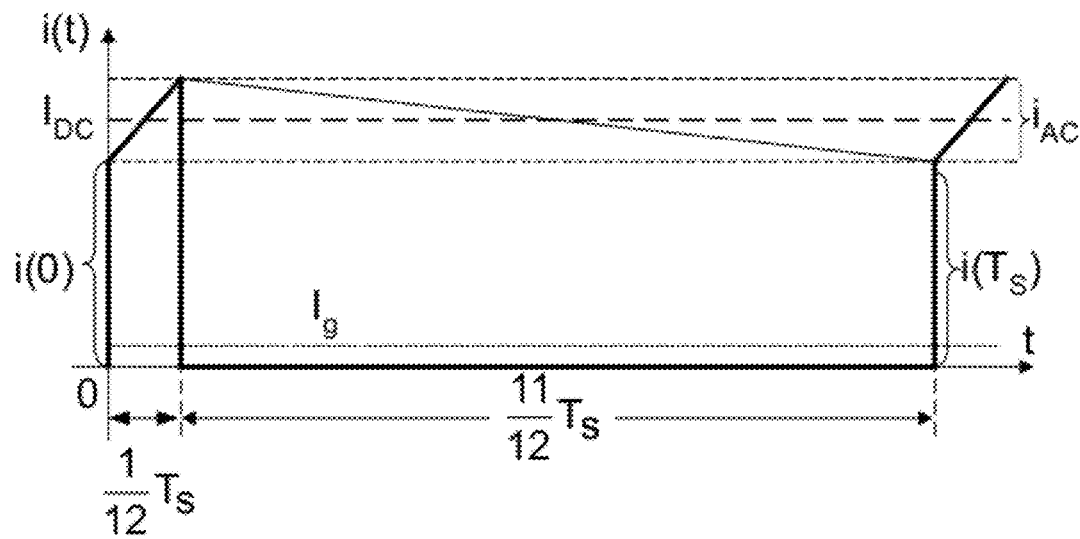
FIG. 2a shows input current of the buck converter in FIG. 1a when operated at large step-down conversion ratio and FIG. 2b shows the ac flux of the inductor in buck converter as a function of duty ratio D.
Figure 2B:
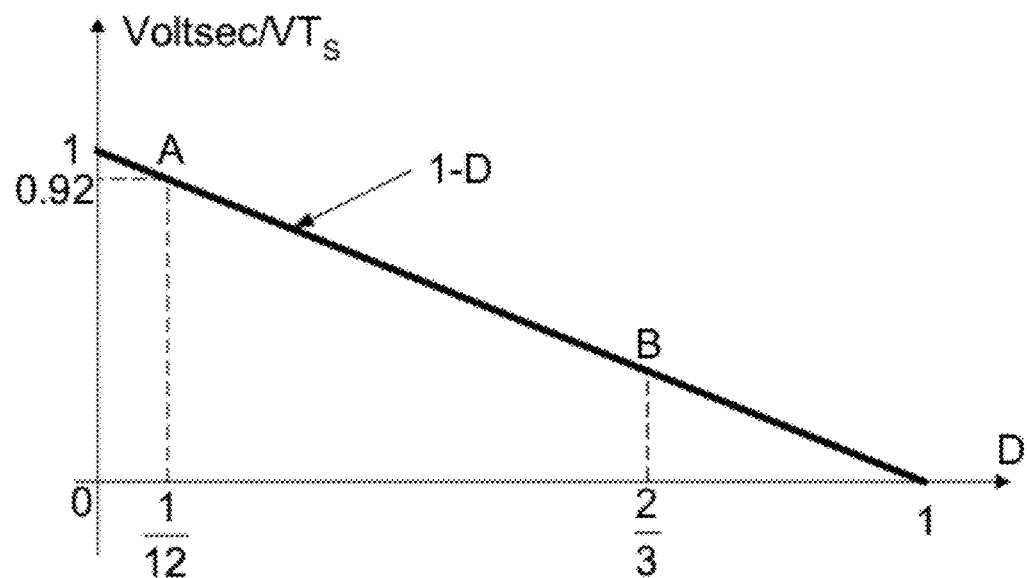

Note also that the operation at higher duty ratios is desirable as it leads directly to the reduction of the ac flux and magnetic size reduction as per graph in FIG. 2b and earlier discussion of the effect of duty ratio operating point on inductor size which now directly translates to corresponding size reduction of the hybrid transformer.

Figure 14B:
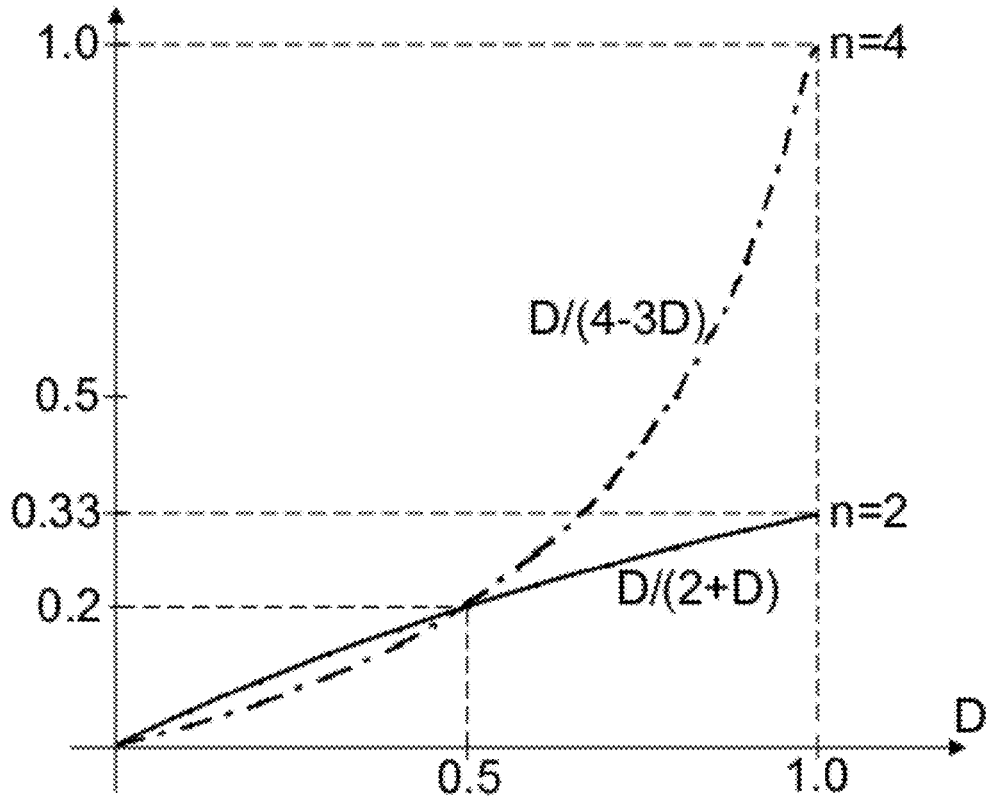

It is now also instructive to compare the operation of the two converter types having the same DC voltage gain at same DC operating duty ratio D point but using the appropriate turns ratios for each case. For example, the present invention with n=2 will result in 5:1 step-down conversion ratio while the tapped-inductor buck converter at duty ratio D=0.5 would need to operate with n=4 as seen at the intersection of the two curves displayed in FIG. 14b at D=0.5. This would clearly result in bigger magnetics sizes and higher magnetic losses of the tapped-inductor buck, due to higher number of turns needed (four instead of two) and corresponding higher DC ampere turns and bigger air-gap needed.

Voltage Stresses of the Three Switches

Figure 15A:
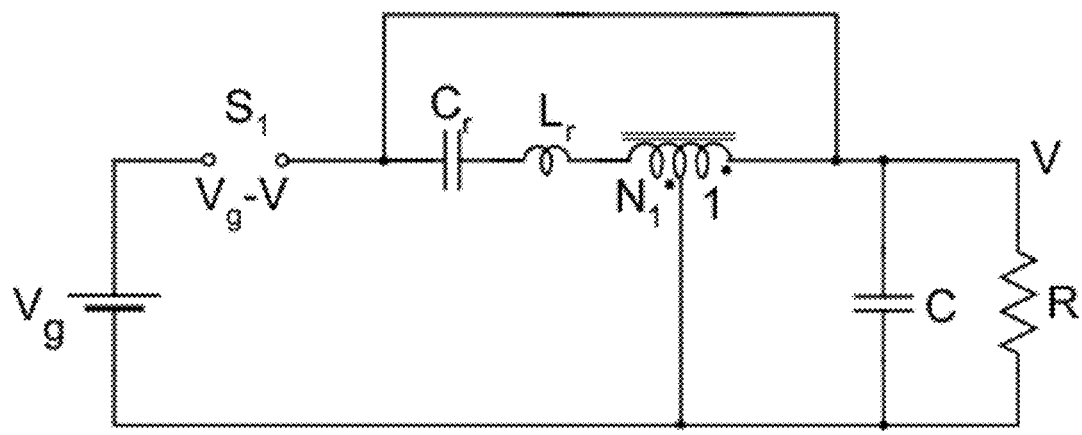
FIG. 15a illustrates converter circuit of FIG. 6a when switch $S_1$ is OFF during OFF-time interval thus displaying the blocking voltage of the $S_1$ switch and FIG. 15b illustrates converter circuit during ON-time interval, when $S_2$ and CR switches are OFF displaying their blocking voltages.
Figure 15B:
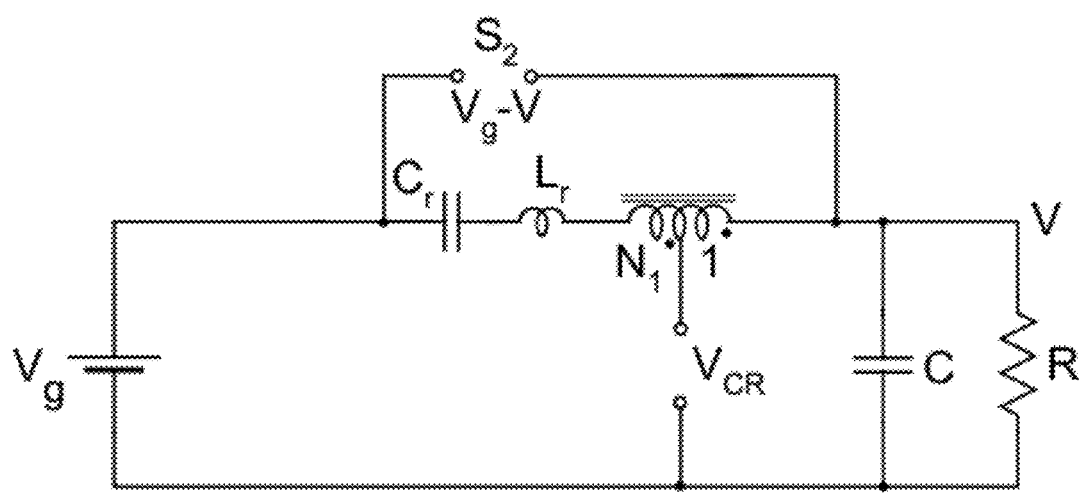

From the derived DC currents in all branches one can also derive analytical expressions for the rms currents in various branches so that the conduction losses of the three switches could be calculated. What remains is to determine the voltage stresses of all three switches so that the proper rated switching devices could be selected. From the circuit diagram for OFF-time interval in FIG. 15a and for ON-time in FIG. 15b the following blocking voltages can be evaluated:

$$S_1: V_{S1}=V_g-V \quad (26)$$

$$S_2: V_{S2}=V_g-V \quad (27)$$

$$CR: V_{CR}=(V_g-V)/n \quad (28)$$

Both active switches have lower voltage stresses than the comparable buck converter. However, note in particular large voltage stress reduction for the rectifier switch CR that conducts most of the power for the large step-down. For example, for 12V to 1V conversion and n=4, the blocking voltage of the rectifier switch is $V_{CR}$=11/4 V=2.75V. This is to be compared with the blocking voltage of 12V for comparable buck converter or a factor of 4.4 reductions in voltage stress of the switch, which processes by far the most of the power to the load for high step-down conversion and is critical for overall efficiency.

Other Switch Implementations

Figure 16A:
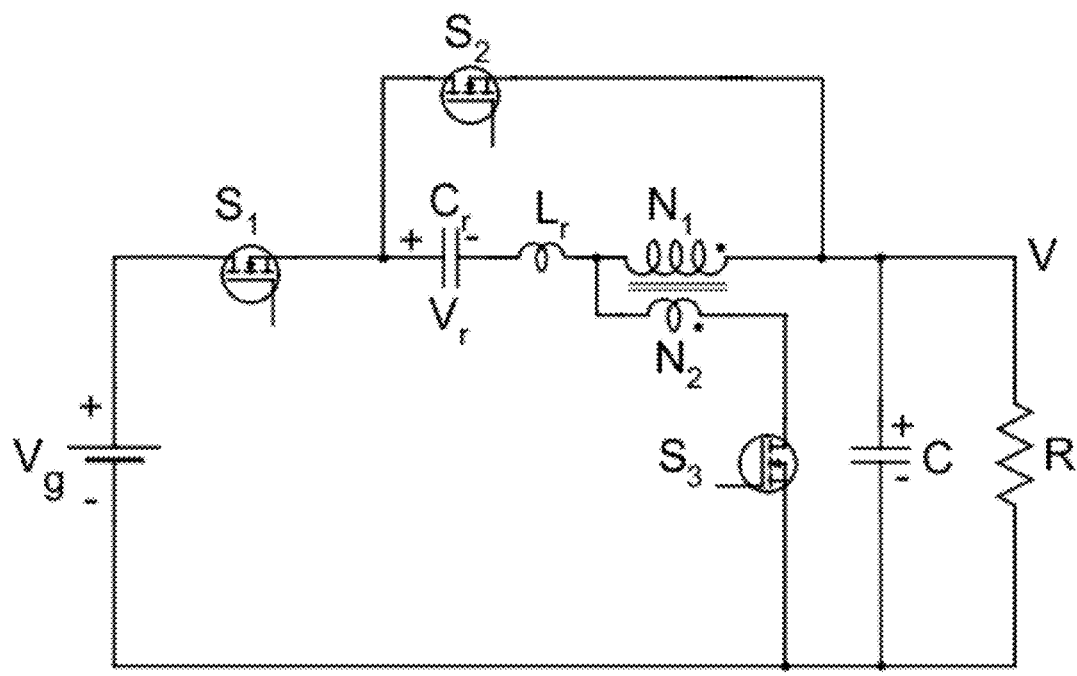
FIG. 16a illustrates one embodiment of converter in FIG. 6a with hybrid transformer replaced by a non-isolated transformer and FIG. 16b illustrates another embodiment of converter in FIG. 6a with hybrid transformer replaced by a non-isolated transformer.
Figure 16B:
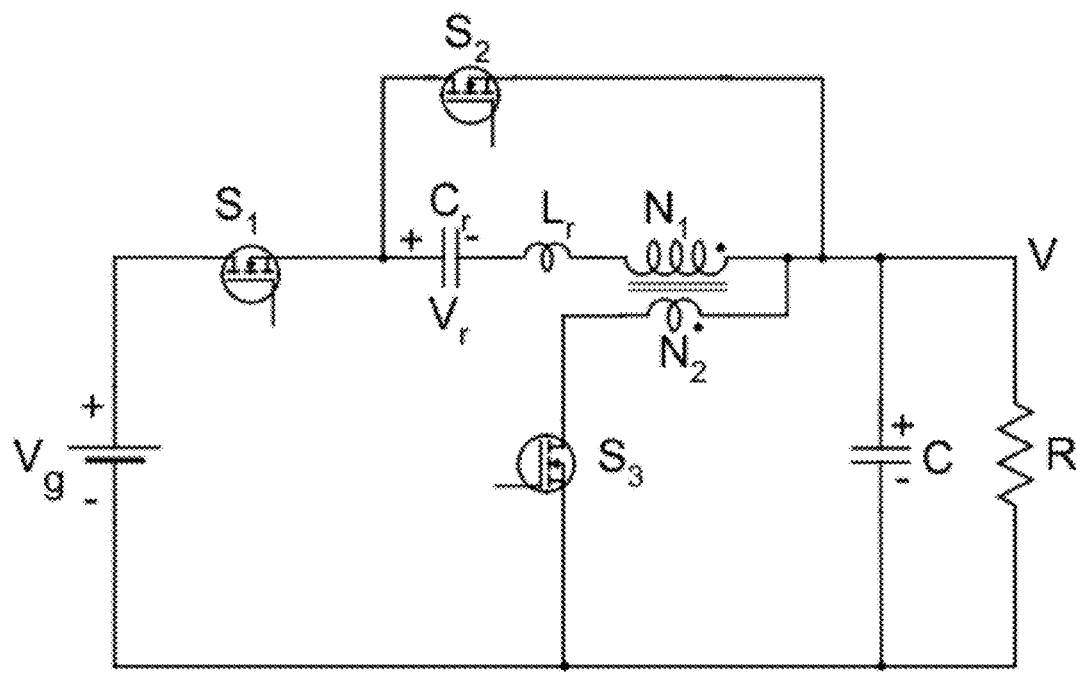
Figure 17A:
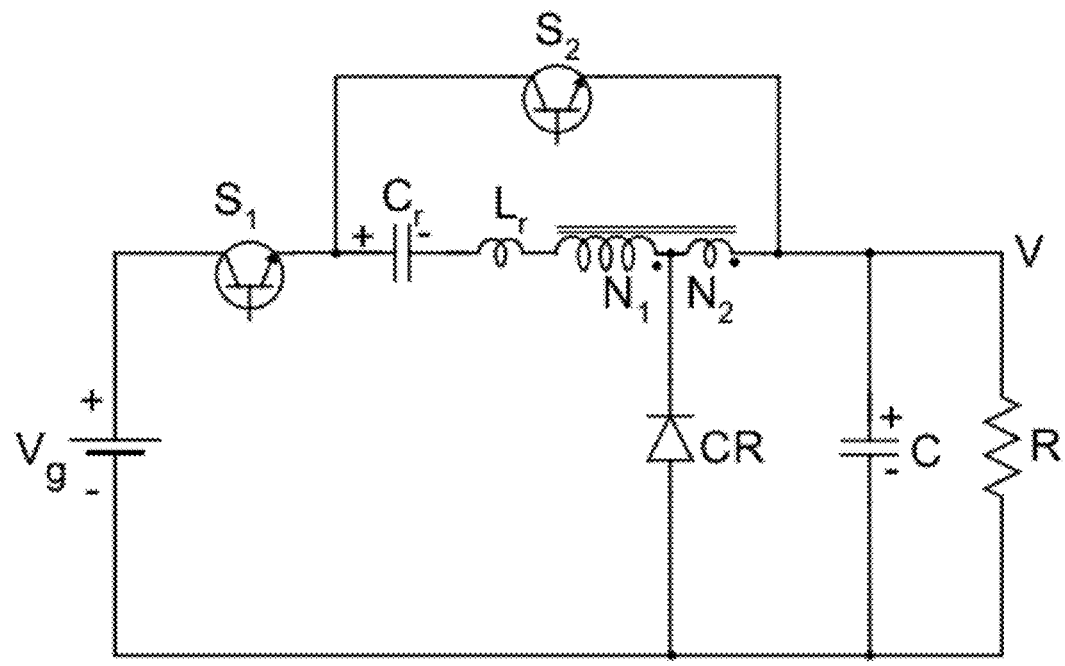
FIG. 17a illustrates one embodiment of converter in FIG. 6a with bipolar transistor implementation and FIG. 17b illustrates another embodiment of converter in FIG. 6a with IGBT and RBIGBT transistors implementation.
Figure 17B:
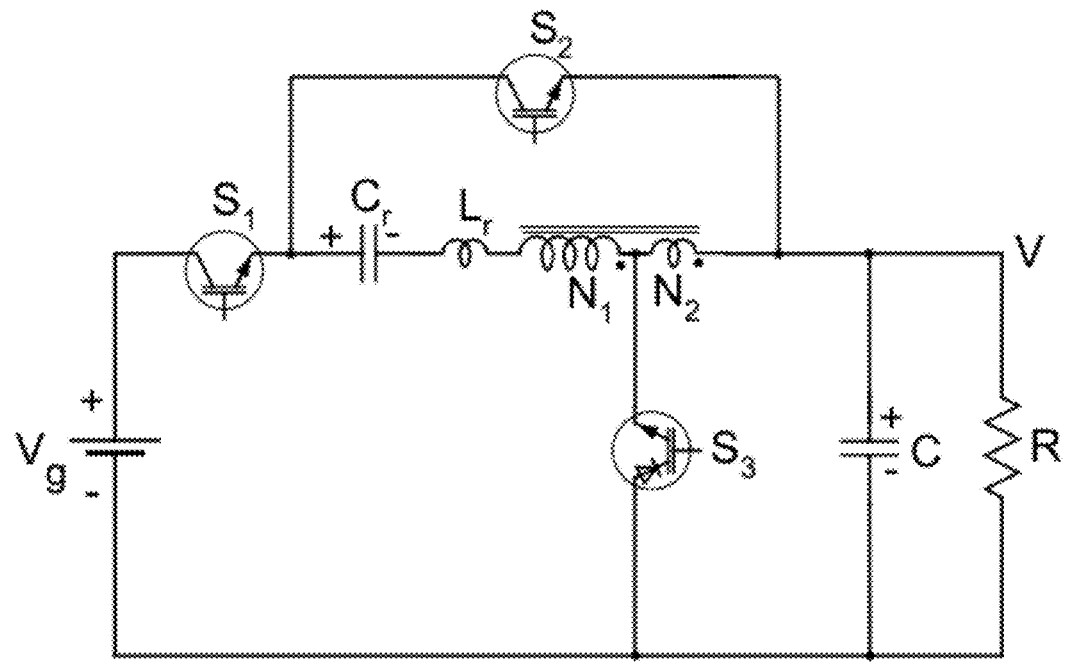

Hybrid transformer can be replaced by a transformer with two separate windings to result in two extensions illustrated in FIG. 16a and FIG. 16b. Other switch implementations are possible using different semiconductor switch technologies. For example, FIG. 17a shows implementation with bipolar transistors and FIG. 17b shows implementation with two IGBT transistors and one RGIGBT transistor.

Large Voltage Step-down Operation

We not turn to describe a very unique performance of the present invention when the large voltage-step-down conversion such as 12:1 or 24:1 is desired, such as for 12V to 1V and 12V to 0.5V conversion. It will be described bellow and experimentally confirmed that the larger the step-down voltage conversion the better performance is of the present invention.

The same experimental prototype used previously is now employed to investigate the performance at low duty ratios, or for large voltage step-downs. The following were the chosen operating conditions: $V_g$=24V, $T_{OFF}$=20 μsec is constant and hybrid transformers with turns ratios n=2 and m=1 was used again. The duty ratio is then adjusted to 0.15 to obtain output voltage of V=1V for an effective 24 to 1 voltage step-down. The experimental waveforms where then recorded for the load current changes from 8 A to 1 A in decrements of 1 A, to observe the behaviors over the wide load current change. These measurements are illustrated in FIG. 18-FIG. 21. The same designations are used for traces as before.

Figure 18A:
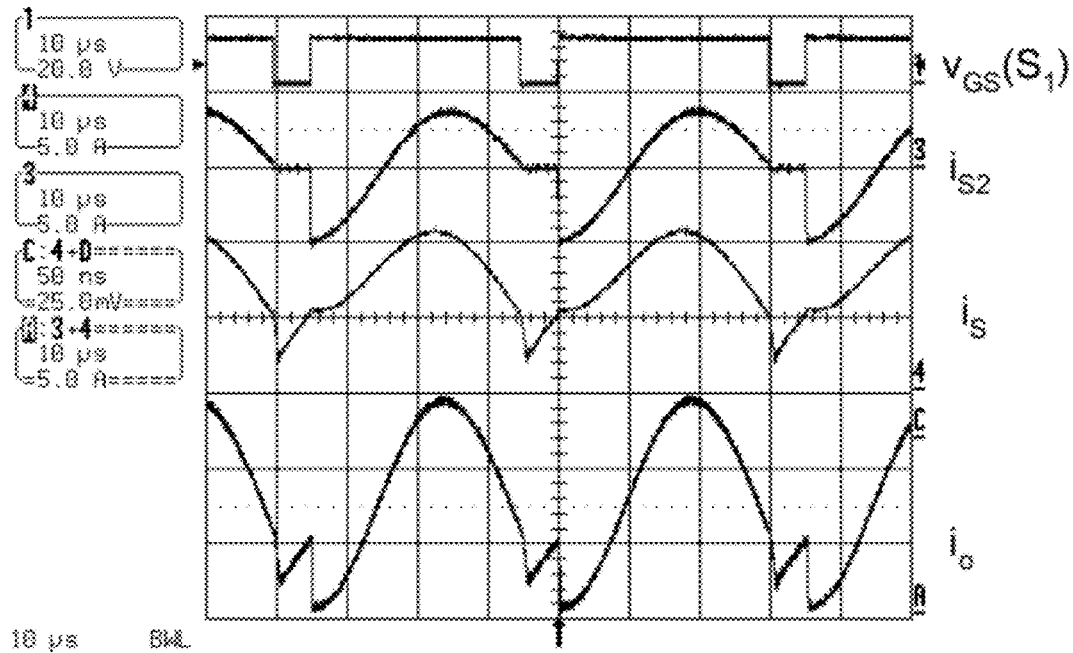
FIG. 18a illustrates the salient waveforms for the prototype of the converter in FIG. 6a measured at 8 A load current. The traces from top to bottom are: a) gate drive of the first switch, b) current of the second switch $i_{S2}$, c) secondary current $i_S$ of the hybrid transformer, d) output current $i_O$ of the converter.
Figure 18B:
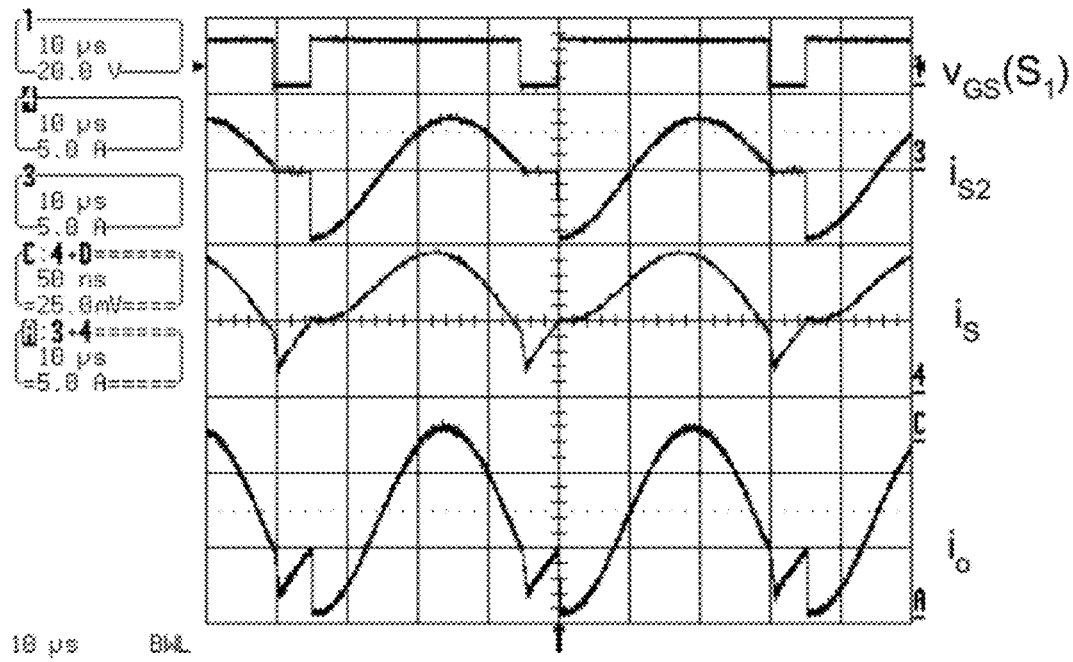
FIG. 18b illustrates the salient waveforms for the prototype of the converter in FIG. 6a measured at 7 A load current. The traces from top to bottom are: a) gate drive of the first switch, b) current of the second switch $i_{S2}$, c) secondary current $i_S$ of the hybrid transformer, d) output current $i_O$ of the converter.
Figure 19A:
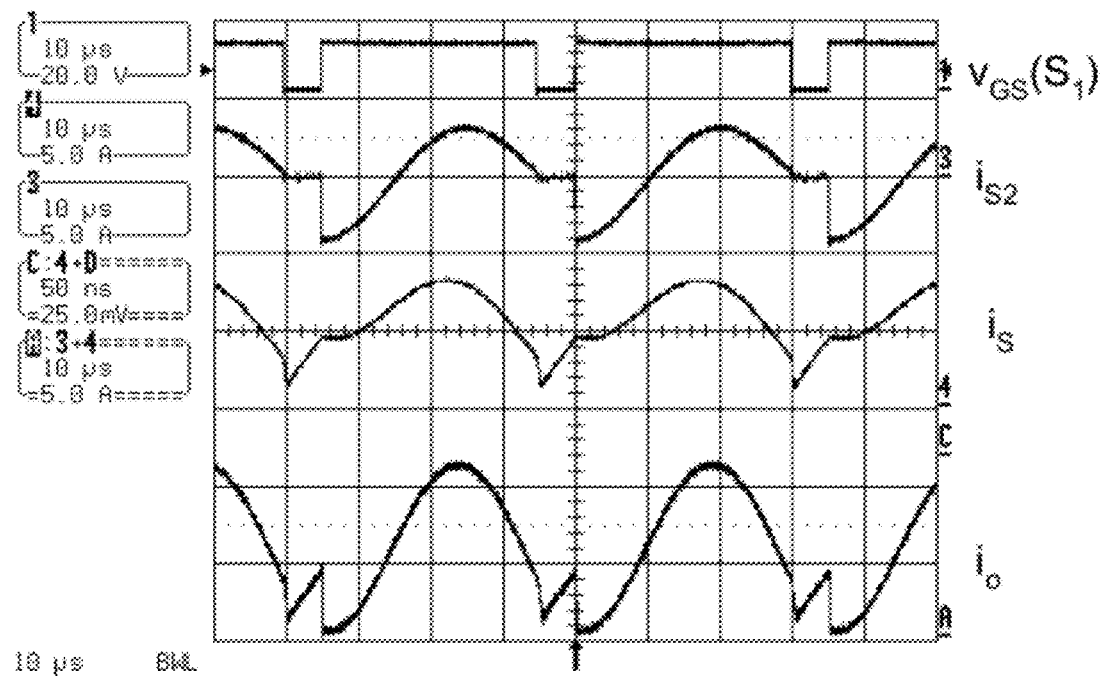
FIG. 19a illustrates the salient waveforms for the prototype of the converter in FIG. 6a measured at 6 A load current. The traces from top to bottom are: a) gate drive of the first switch, b) current of the second switch $i_{S2}$, c) secondary current $i_S$ of the hybrid transformer, d) output current $i_O$ of the converter.
Figure 19B:
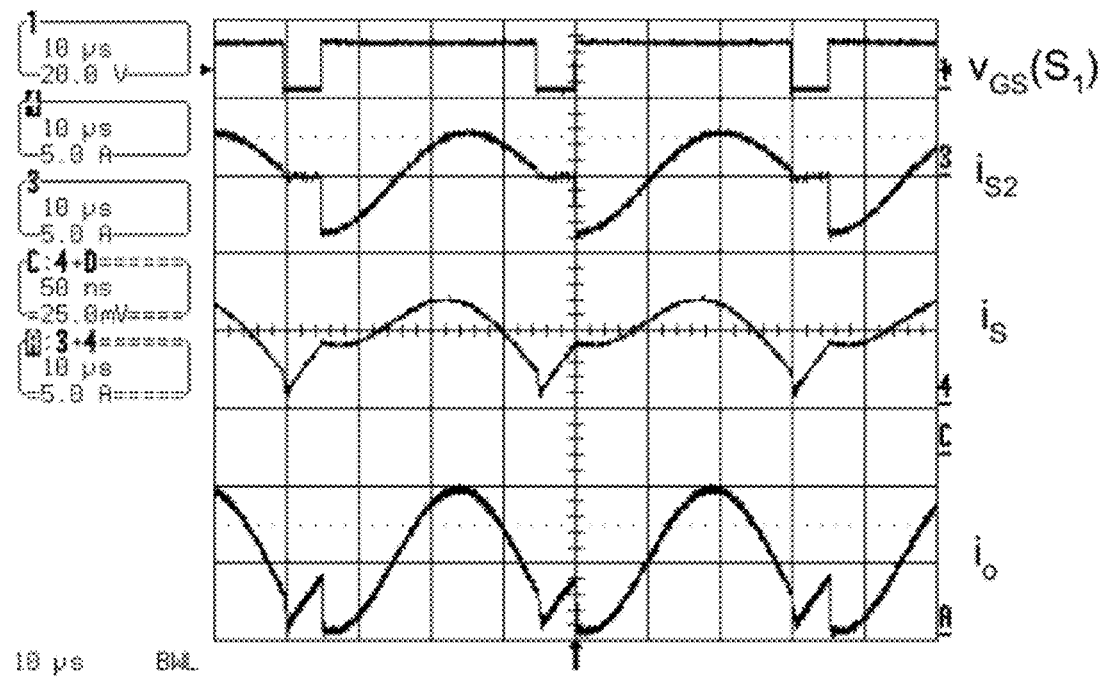
FIG. 19b illustrates the salient waveforms for the prototype of the converter in FIG. 6a measured at 5 A load current. The traces from top to bottom are: a) gate drive of the first switch, b) current of the second switch $i_{S2}$, c) secondary current $i_S$ of the hybrid transformer, d) output current $i_O$ of the converter.
Figure 20A:
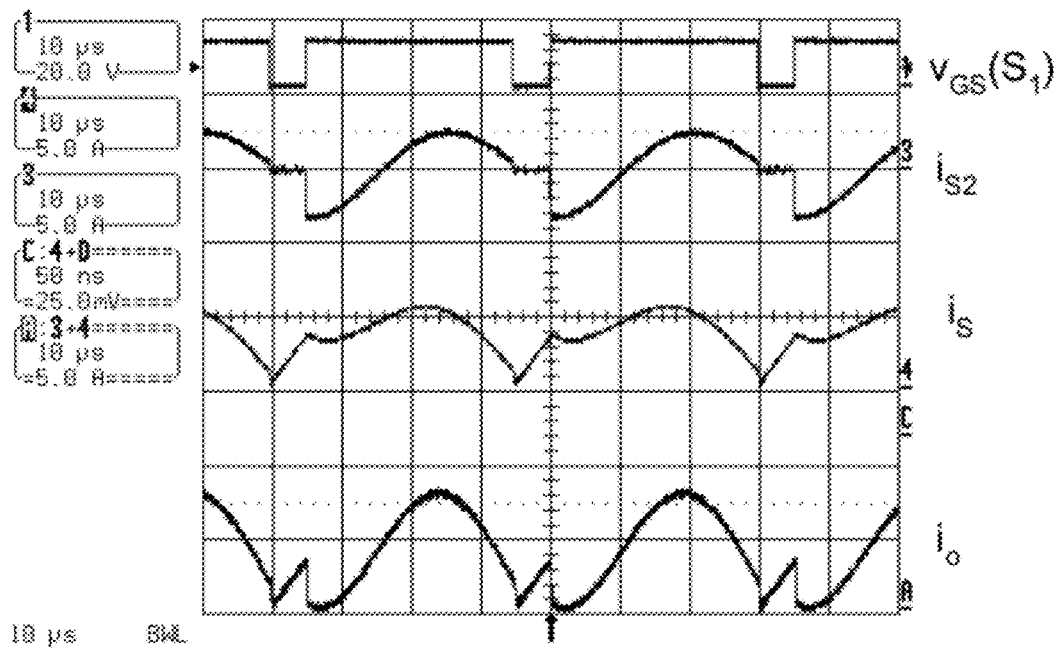
FIG. 20a illustrates the salient waveforms for the prototype of the converter in FIG. 6a measured at 4 A load current. The traces from top to bottom are: a) gate drive of the first switch, b) current of the second switch $i_{S2}$, c) secondary current $i_S$ of the hybrid transformer, d) output current $i_O$ of the converter.
Figure 20B:
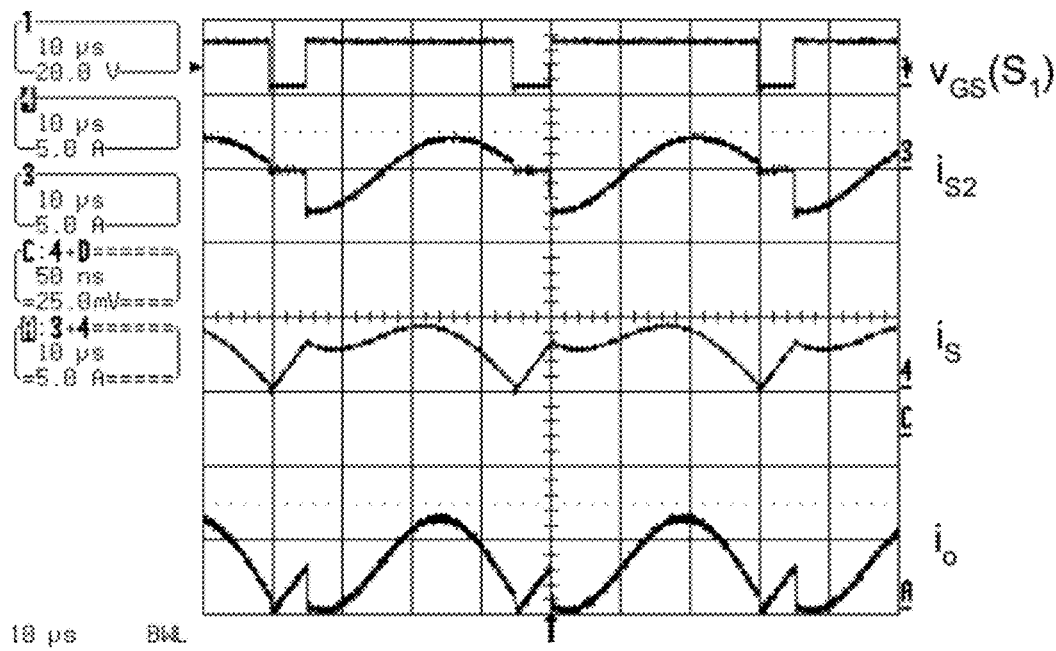
FIG. 20b illustrates the salient waveforms for the prototype of the converter in FIG. 6a measured at 3 A load current. The traces from top to bottom are: a) gate drive of the first switch, b) current of the second switch $i_{S2}$, c) secondary current $i_S$ of the hybrid transformer, d) output current $i_O$ of the converter.
Figure 21A:
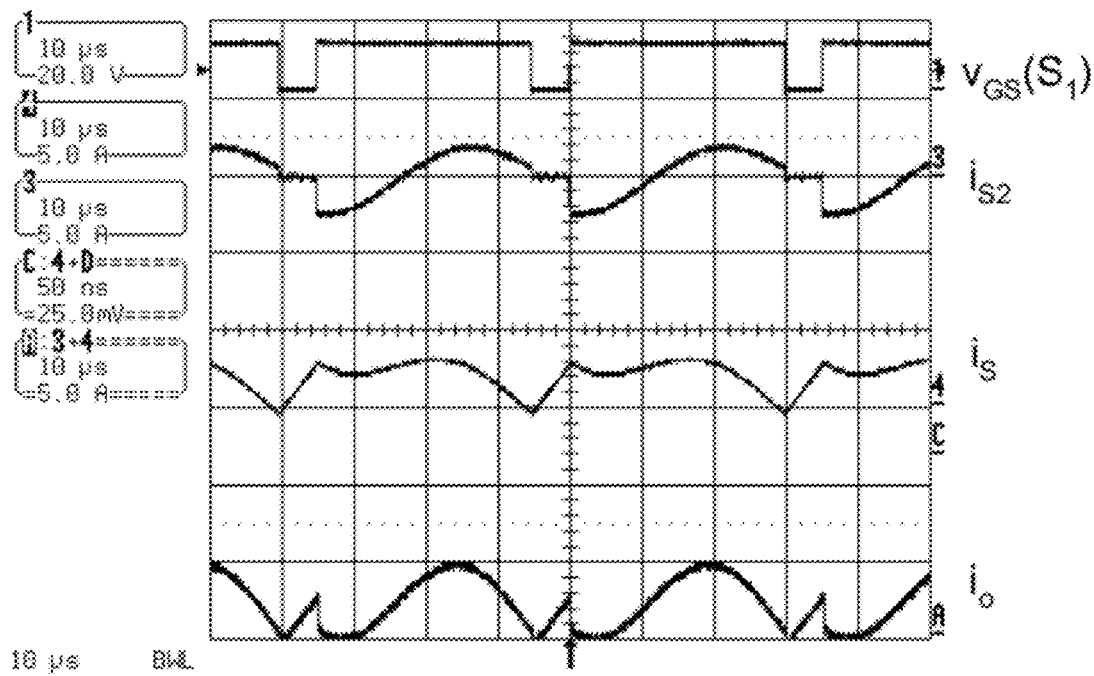
FIG. 21a illustrates the salient waveforms for the prototype of the converter in FIG. 6a measured at 2 A load current. The traces from top to bottom are: a) gate drive of the first switch, b) current of the second switch $i_{S2}$, c) secondary current $i_S$ of the hybrid transformer, d) output current $i_O$ of the converter.
Figure 21B:
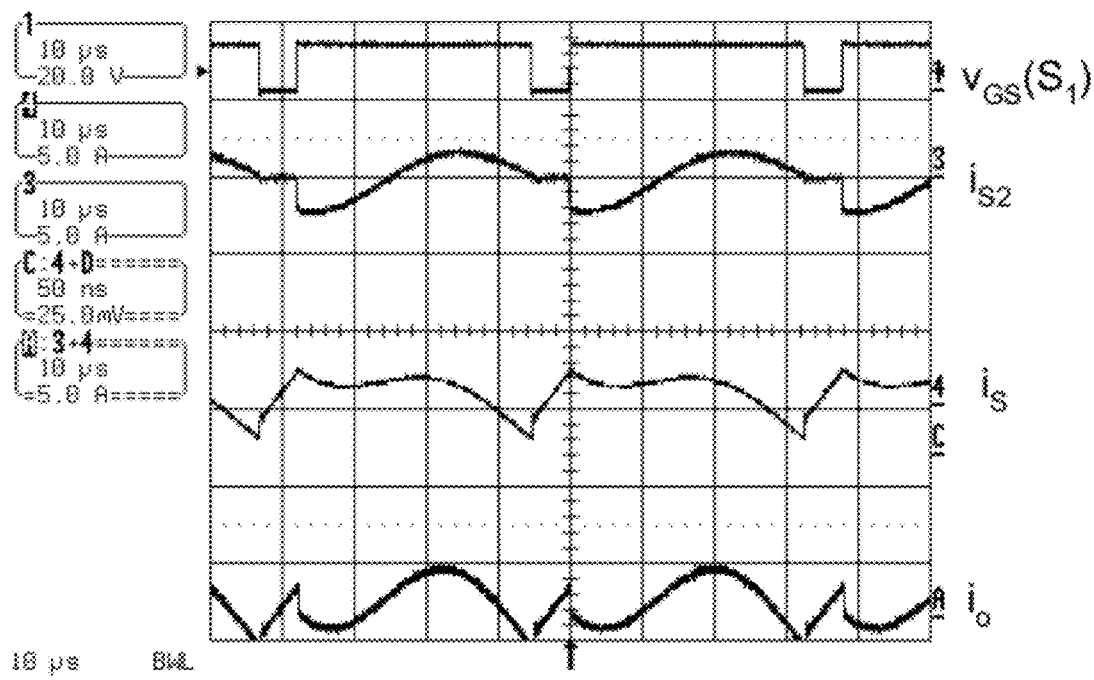
FIG. 21b illustrates the salient waveforms for the prototype of the converter in FIG. 6a measured at 1 A load current. The traces from top to bottom are: a) gate drive of the first switch, b) current of the second switch $i_{S2}$, c) secondary current $i_S$ of the hybrid transformer, d) output current $i_O$ of the converter.

Note a rather remarkable qualitative difference in the wave-shape of the output current as illustrated in FIG. 18a for 8 A load current and in FIG. 18b for 7 A load current. The output current is changed from the wave shape of a half of the resonant sinusoidal current starting at zero current and ending at zero current (see previous waveforms) to an effective full-wave resonant current, which also start at zero current and ends up at a zero current. Note that this result in output current waveform for small duty ratio D, which could be very closely described as:

$$i_0(t)=I+I\sin(\omega_r t) \quad (29)$$

where I is the average DC load current and I is also a peak of the full sinusoidal resonant output current waveform. The measurement taken for reduced load currents of 6 A, 5 A, 4 A, 3 A, 2 A and 1 A shown in FIG. 19-FIG. 21 do confirm that the full-wave sinusoidal-like load current always starts from zero and has the average value equal to the respective DC load current.

This is very important result, confirming that for large and sudden changes in the load current, the converter does not need to go through many cycles to settle on a new steady-state, as the same steady state is reached every cycle. With DC load current reduced the peak magnitude of the output sinusoidal current is likewise adjusted to the new value in a single cycle.

This unique property can also be fully taken advantage of by paralleling the two identical converters as described in next section.

Two-Phase Extension

The common method to reduce the output voltage ripple in the buck converter is to use a multi-phase buck converter with several buck converters (typically four phases) which are operated in parallel but phase shifted by a quarter of period to result in reduced ripple current and reduced output ripple voltage.

Figure 22A:
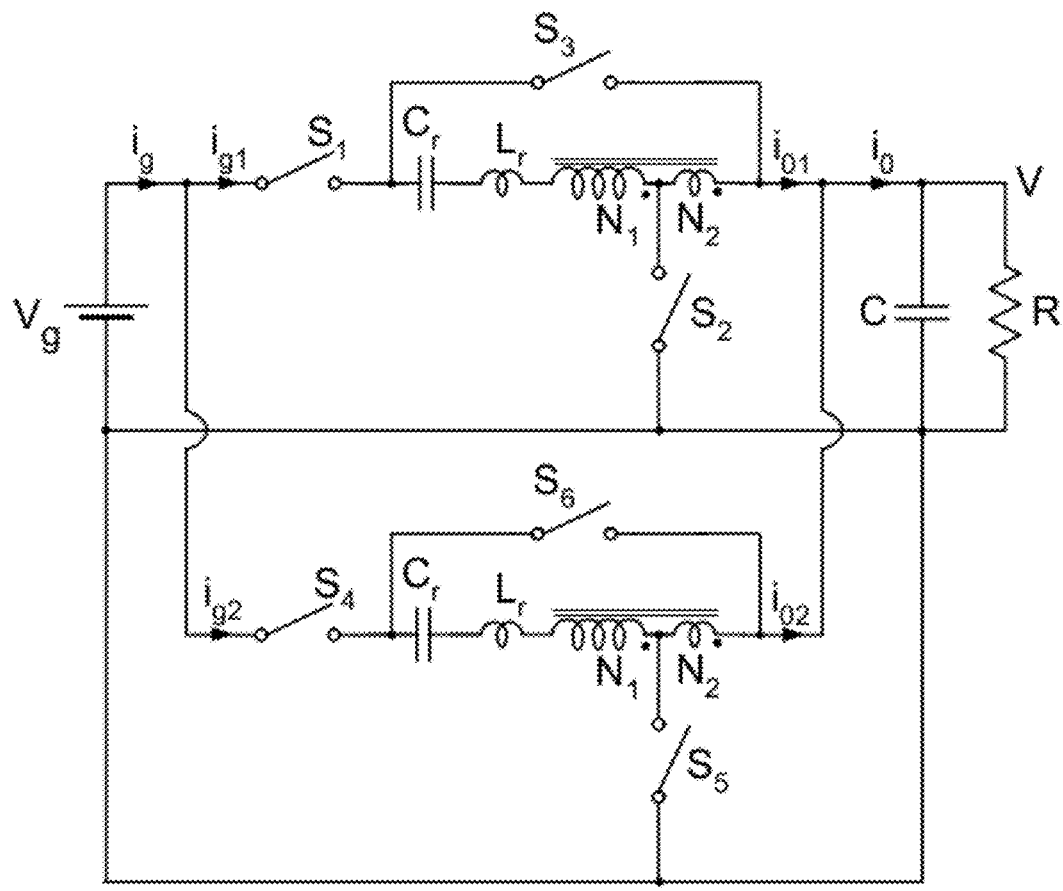
FIG. 22a shows the two-phase extension of the present invention in which two modules are operated in parallel but phase shifted for half a period in order to obtained the reduced output ripple voltage and FIG. 22b shows the respective diagram of the state of all the switches.
Figure 22B:
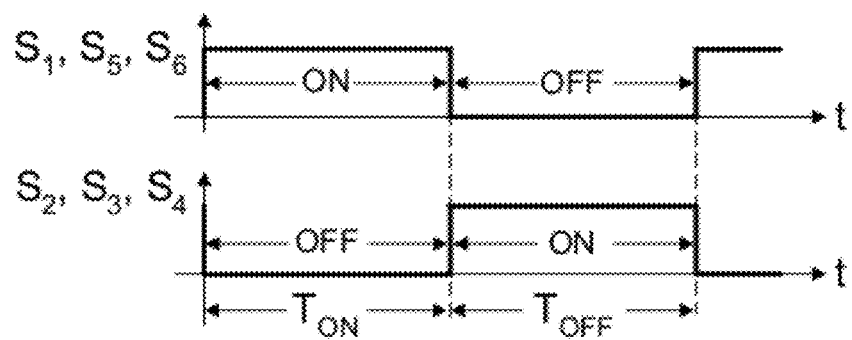

The present invention, however, makes possible the near ideal cancellation of the output ripple current with just two phases as illustrated in the two-phase converter implementation shown in FIG. 22a. The two converters are identical except that they are operated completely out of phase, so that per (29), each converter output current can be described ideally as:

$$i_{o1}(t)=I+I\sin(\omega_r t) \quad (30)$$

$$i_{o2}(t)=I-I\sin(\omega_r t) \quad (31)$$

Therefore, the total output current $i_O$ of the two modules is then:

$$i_o(t)=i_{o1}(t)+i_{o1}(t)=2I \quad (32)$$

since the DC currents of each phase-module add together while their time varying sinusoidal currents ideally cancel.

Figure 23A:
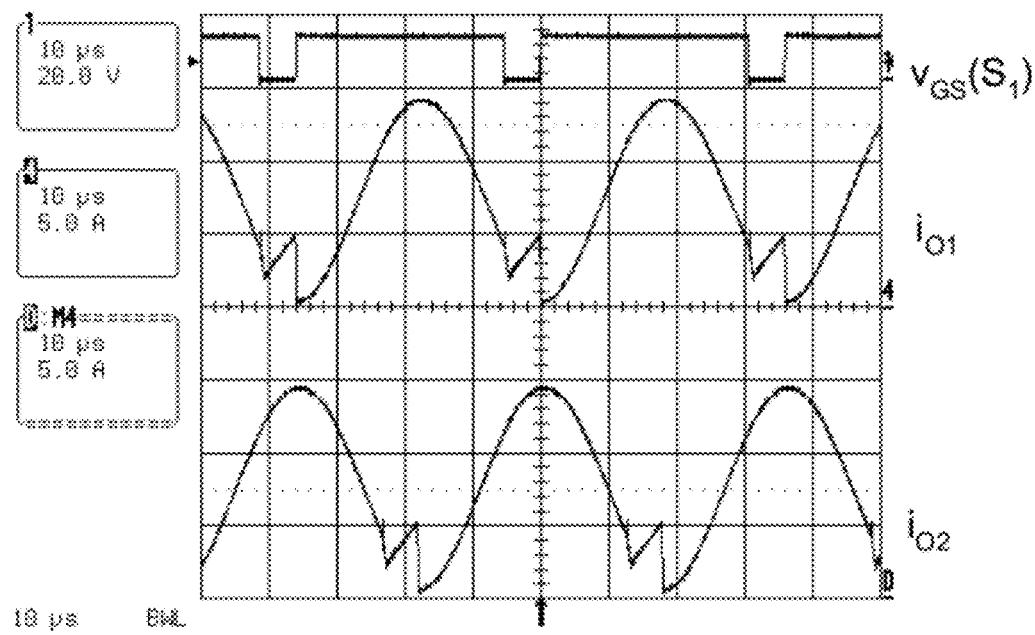
FIG. 23a shows the output current waveforms of the two modules in FIG. 22a with each module carrying a 5 A load current for a total of 10 A load current and operating from 24V input and n=2 hybrid transformer turns ratio which results in 1V output voltage and FIG. 23b shows the total output current waveform (bottom trace) and output ripple current (middle trace) under the same conditions.
Figure 23B:
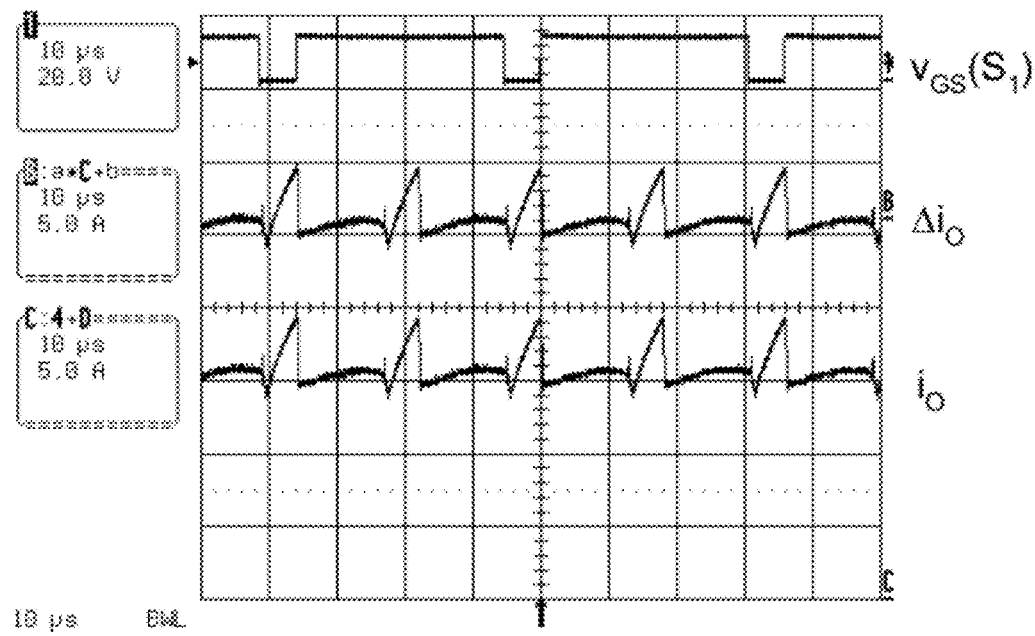

The actual current waveform of each of the two-phase modules are shown in FIG. 23a to have some non-ideal AC ripple during the short ON-time interval. Therefore the ripple current cancellation is not complete, and there are residual ripple currents as shown in FIG. 23b. Nevertheless, the smaller the duty ratio and bigger the step-down voltage, the smaller will be the residual ripple currents.

Figure 24A:
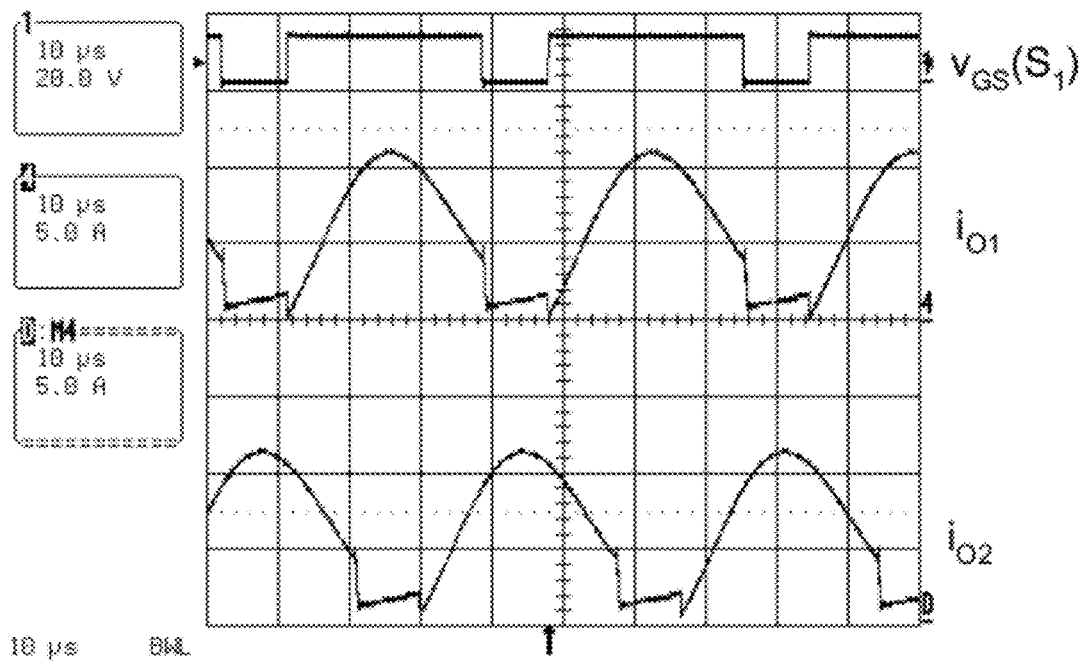
FIG. 24a shows the output current waveforms of the two modules in FIG. 22a with each module carrying a 5 A load current for a total of 10 A load current and operating from 24V input and n=4 hybrid transformer turns ratio which results in 2.35V output voltage
Figure 24B:
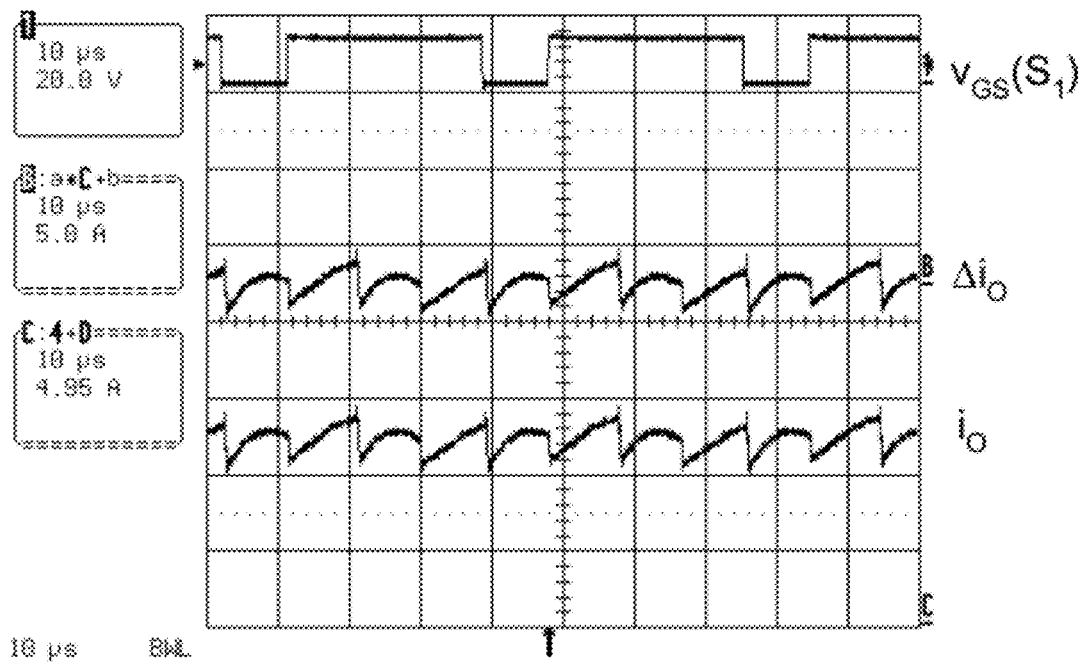
FIG. 24b shows the total output current waveform (bottom trace) and output ripple current (middle trace) under the same conditions.

Another example is illustrated for the transformer turns ratio n=4 and for duty ratio D=0.25, with output current waveforms in FIG. 24a output voltage is now measured at 2.35V for 24V input voltage (10 to 1 effective voltage step-down). Note how the ripple current (middle trace in FIG. 24b) is now a very small part of the output DC current (bottom trace in FIG. 24b with superimposed DC current level) of around 5%-10% relative ripple current and at the frequency, which is four times the switching frequency. Therefore, it would require a very small output filtering capacitor C to reduce the output ripple voltage to an ultra low value.

Reduction of Turn-OFF Losses of the Main Input Switch

As explained in introduction with reference to FIG. 2a the turn-OFF current in buck converter is equal to the peak load current, resulting in high turn-OFF losses of the input switch of the buck converter, which in fact, are by far dominant losses in the buck converter, especially at very high switching frequency of 1 MHz, since these losses are proportional to frequency. As seen in FIG. 24a the peak turn-OFF current for present invention with 2:1 turns ratio and at 0.15 duty ratio is several times lower than the peak load current of the buck converter reducing turn-OFF losses of main switch.

Other Embodiments

Figure 25A:
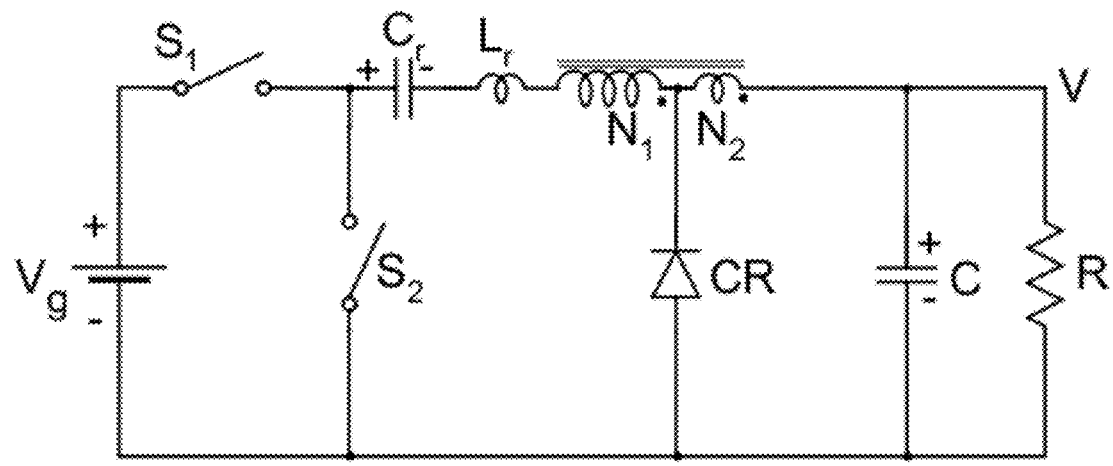
FIG. 25a illustrates another embodiment of present invention.

An alternative converter topology could be obtained by connecting the second switch $S_2$ of the basic converter in FIG. 6a to the ground instead of to the output terminal to result in another converter embodiment shown in FIG. 25a. This configuration has a disadvantage that the resonant current does not directly contribute to the load as in previous case, but does keep the same contribution through the hybrid transformer.

Figure 25B:
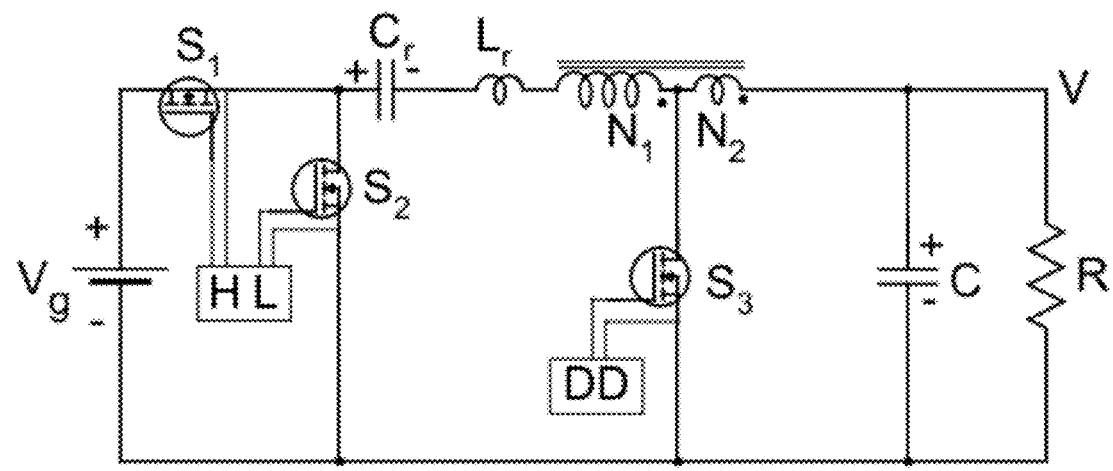
Figure 26A:
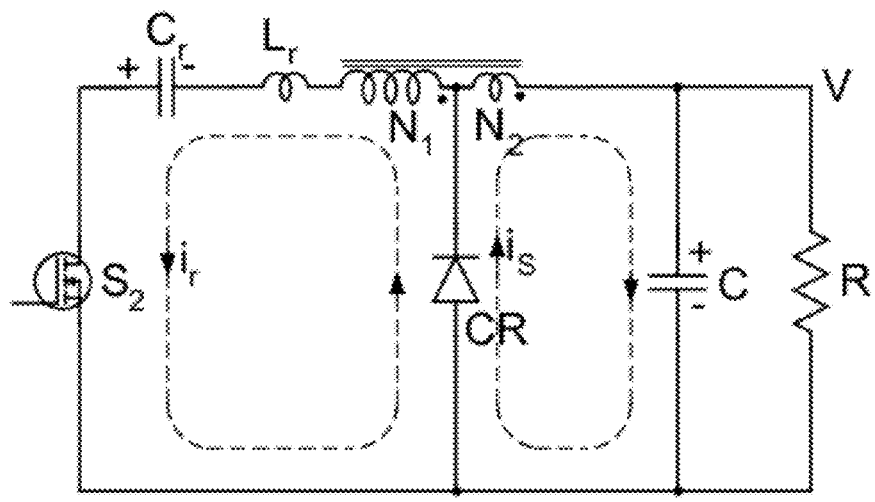
FIG. 26a illustrates the converter circuit for OFF-time interval for the converter in FIG. 25a, FIG. 26b illustrates a simplified circuit model with voltage source $V_{N1}$.
Figure 26B:
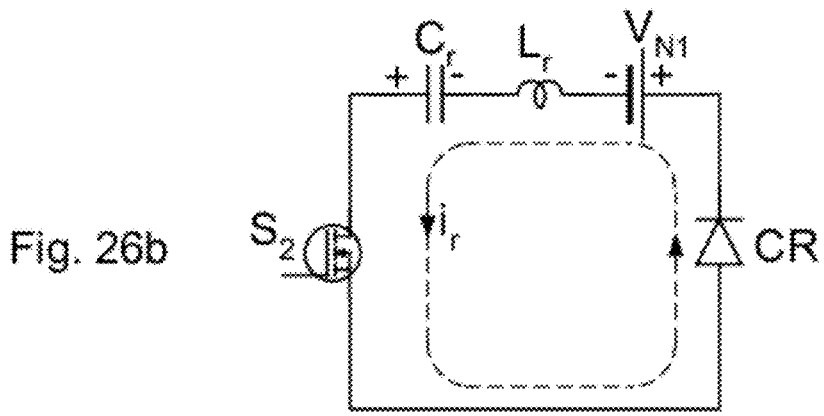
FIG. 26c shows ac circuit model in which DC components are eliminated and FIG. 26d shows the final linear resonant circuit model applicable for OFF-time interval.
Figure 26C:
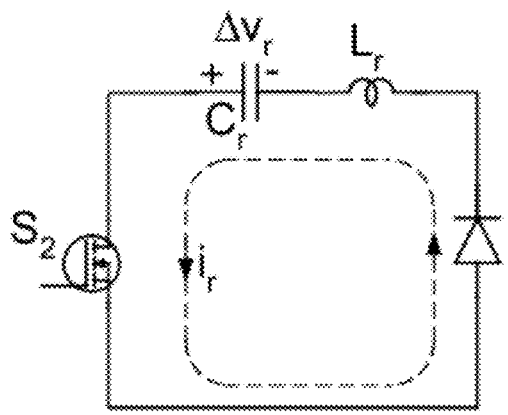
Figure 26D:
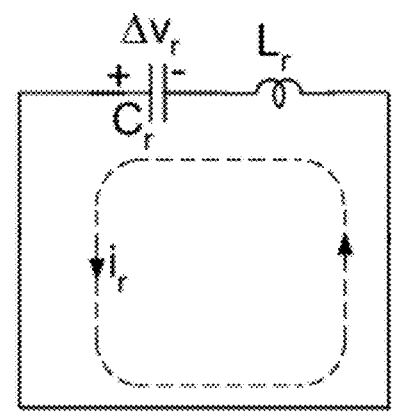

The implementation of converter in FIG. 25a with all MOSFET transistors is shown in FIG. 25b. This practical implementation shows additional advantages:
a) simple drive for $S_1$ and $S_2$ switches using the high-side driver and direct drive for synchronous rectifier switch $S_3$.
b) protection of the load from switch $S_1$ failing short and staying in short condition.

Those skilled in the art could also find other beneficial placements of the resonant inductor, which would also employ above combined inductive and capacitive energy storage and transfer which is the main feature of the present invention.

Protection of the Load

The converter extension of FIG. 25b has one important practical advantage over both buck converter and autotransformer buck due to the presence of the resonant capacitor $C_r$ in series with the load and the position of the branch with the resonant inductor and active switch $S_2$ which provides an over voltage protection of the load from a single point failure (shorting of the main switch $S_1$).

In the buck converter, shorting of the main switch will cause that the input 12V voltage will be directly applied to low 1V output and result in damage to the expensive loads such as microprocessors.

This cannot happen in this extension of the present invention, since shorting of the input switch will not cause the damage to the load. After a small transient spike the output voltage will be reduced to near zero output voltage as the resonant capacitor and output capacitor serve as an effective capacitive divider. Since the output capacitor value is many times (at least ten times) higher in value than the resonant capacitor, the output voltage will be limited to 1/10 of input voltage or 1.2V.

Equally important, a single-point failure of the resonant capacitor (its shorting) will not result in the catastrophic destruction either as the present invention of FIG. 25b will continue to operate as a modified buck converter.

Modeling and Analysis

Figure 27A:
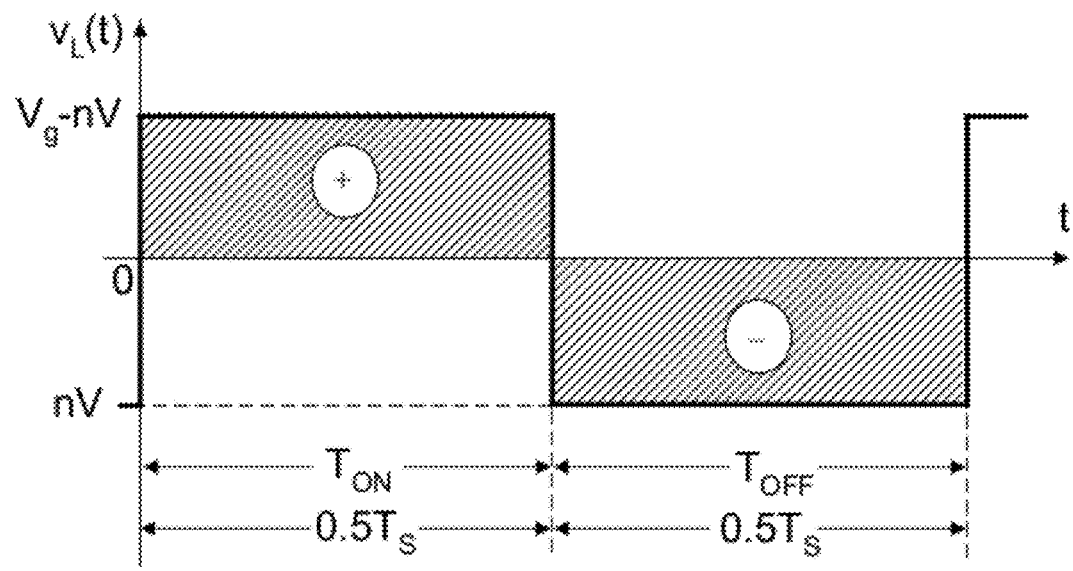
FIG. 27a illustrates a voltage waveform across N turns of hybrid transformer of the converter in FIG. 25a, FIG. 27b shows the resonant capacitor voltage waveform
Figure 27B:
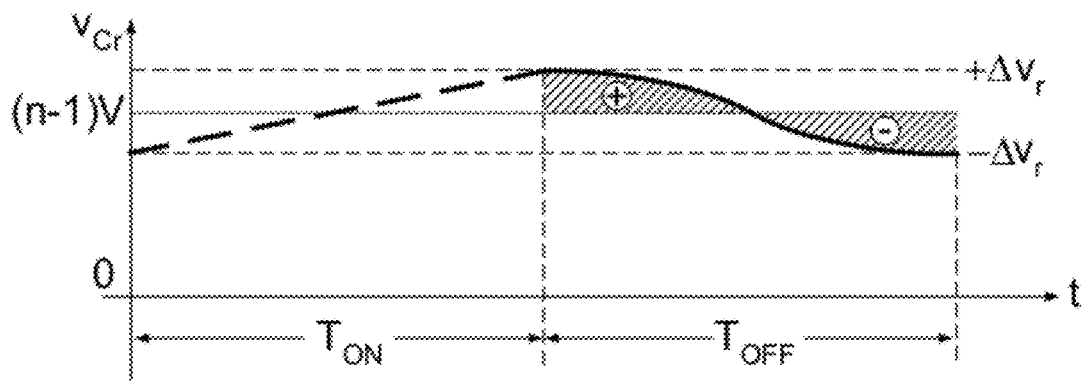
Figure 27C:
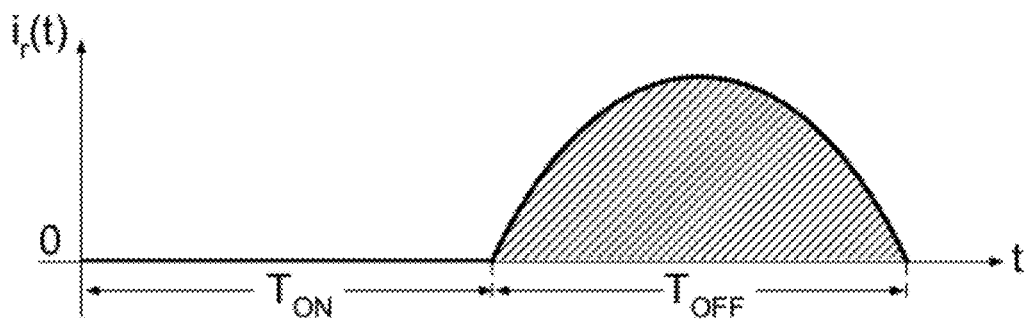

Equivalent circuit model analysis of converter in FIG. 25a follows the same as for converter in FIG. 6a, but this time using the equivalent circuit models in FIGS. 26a-d which can be used to find the voltage waveforms on the hybrid transformer as shown in FIG. 27a and the instantaneous voltage on the resonant capacitor $C_r$ as shown in FIG. 27b and the resonant inductor current $i_r$, as shown in FIG. 27c. Note the main difference is that the resonant capacitor voltage $V_{Cr}$ has now different DC steady state value, which is evaluated next.

Evaluation of DC Voltage Gain

We now turn to evaluation of the DC voltage gain for the converter topology in FIG. 25a. We assume a duty ratio control D of the main switch $S_1$.

Flux Balance on Two Magnetic Components

First the flux balance on the resonant inductor $L_r$ can be now shown for an arbitrary turns ratio n to:

$$\int v_r dt = V_r - (n-1)V = 0 \quad (33)$$

We than apply the second flux balance criteria, the flux balance on the hybrid transformer (equality of the shaded areas in FIG. 27a) to obtain:

$$V_g D - nVD = nV(1-D) \quad (34)$$

$$M = D/n \quad (35)$$

Figure 28A:
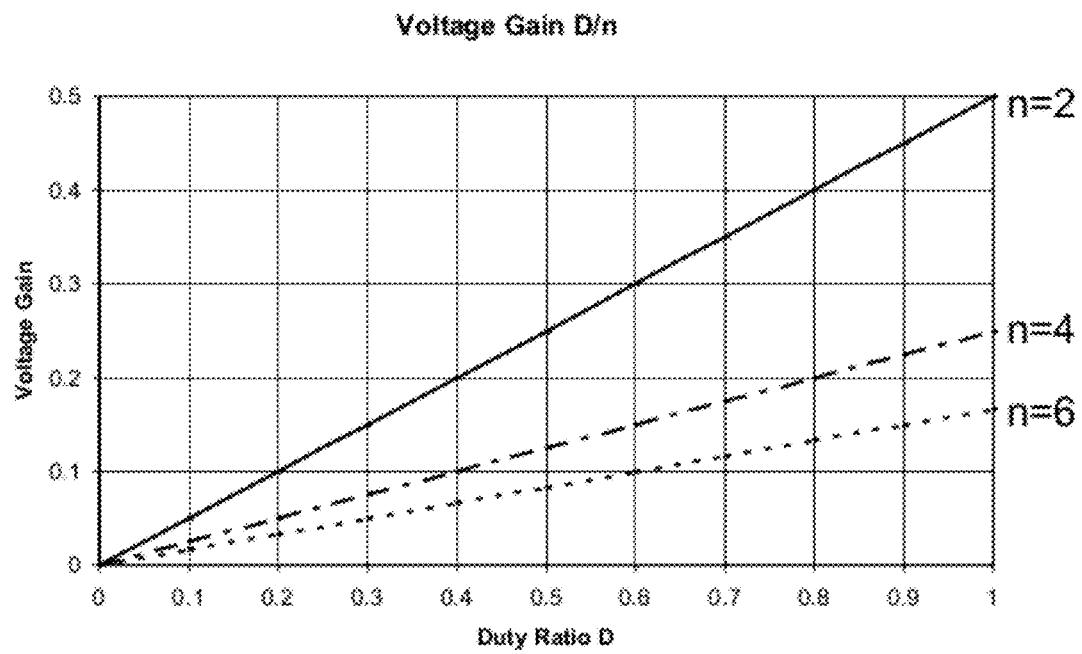
FIG. 28a shows the family of the DC voltage gain plots obtained for different hybrid transformer turns ratio's n for the converter of FIG. 25a and FIG. 28b shows the experimental DC voltage gain verification for n=2.
Figure 28B:
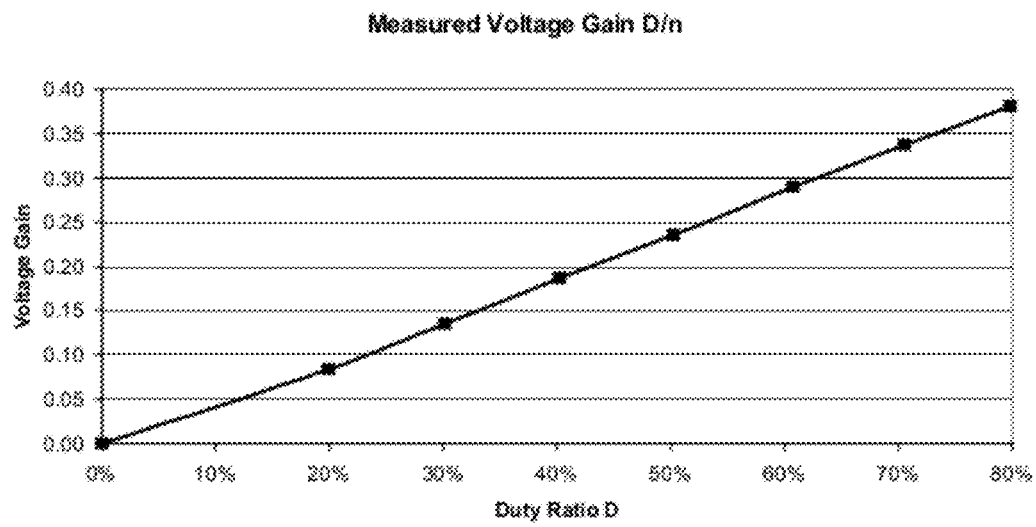

The family of the DC conversion gains as a function of duty ratio for different turns ratios n is shown in graphs in FIG. 28a. Note once again a remarkable result (35). Despite the presence of the resonance, owing to the hybrid-switching method described above, the DC voltage gain M is only a function of the duty ratio D and the hybrid transformer turns ratio n and is NOT a function of resonant component values nor the load current I. All other switching methods employing one or more resonant inductors result in the heavy dependence on the resonant component values as well as the DC load current. Furthermore, equation (35) shows a linear dependence of DC voltage gain on duty ratio D, just like in an ordinary buck converter, except with the additional reduction ratio equal to hybrid transformer turns ratio n. Linearity of the DC voltage gain as a function of duty ratio could be used to the advantage in some applications, such as amplifiers consisting of two such converters as it would lead to distortion free linear amplification. The linearity of the DC voltage gain is experimentally confirmed for the case of n=2 and illustrated with measurement results shown in FIG. 28b.

Resonant Circuit Analysis

The same resonant circuit model is obtained for this case (FIG. 25a), so the same resonant equations derived previously for the original circuit of FIG. 6a apply equally well for this converter topology. Clearly, the DC voltage gains of the two topologies are different as seen by comparing their analytical equations (14) and (35).

Voltage Stresses of the Three Switches

Figure 29A:
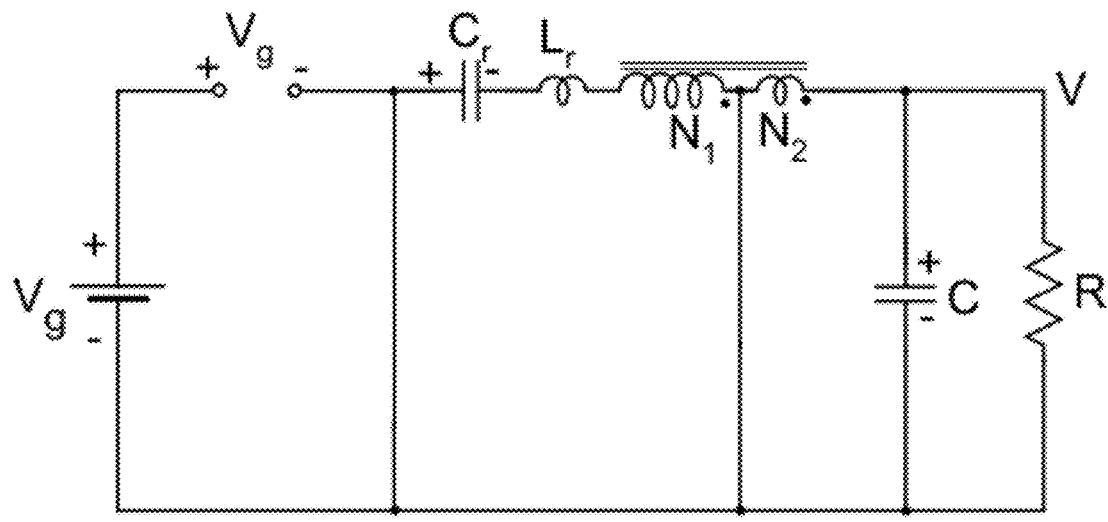
FIG. 29a shows the converter circuit of FIG. 25a for the OFF-time interval and FIG. 29b shows the converter circuit of FIG. 25a for the ON-time interval.
Figure 29B:
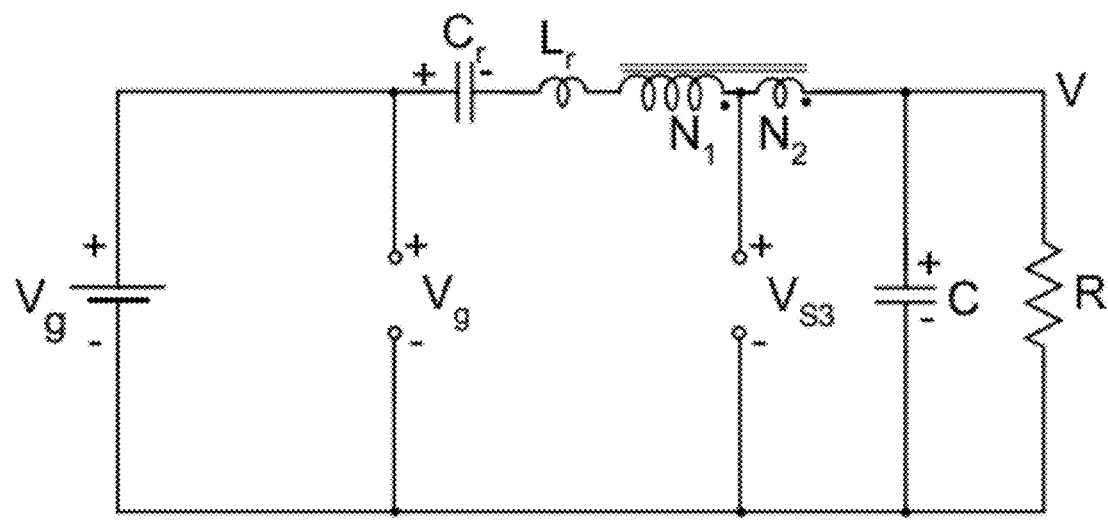

Let us now evaluate the voltage stresses in the converter of FIG. 29a. From the circuit diagram for OFF-time interval in FIG. 29a and for ON-time in FIG. 29b we have:

$$S_1: V_{S1}=V_g \quad (36)$$

$$S_2: V_{S2}=V_g \quad (37)$$

$$S_3: V_{S3}=V_g/n \quad (38)$$

Both active switches have voltage stresses equal to the input voltage as in a buck converter. However, note in particular large voltage stress reduction for the synchronous rectifier switch $S_3$ that conducts most of the power for the large step-down. For example, for 12V to 1V conversion and n=4, the blocking voltage of the synchronous rectifier switch is $V_{S3}$=12/4 V=3V. This is to be compared with the blocking voltage of 12V for comparable buck converter or a factor of 4 times reduction in voltage stress of the switch.

Voltage Regulation via Duty Ratio Control

The converters of present invention in FIG. 6a and FIG. 25a and their various implementations have a number of distinguishing characteristics when compared to other resonant switching converters:
a) they contain one separate resonant inductor which is fully fluxed balanced during OFF-time interval and its value together with the resonant capacitor value is used to determine the optimum turn-OFF-time interval.
b) they contain a hybrid transformer which provides the transfer of both inductive and capacitive input energy storage to the output. This hybrid transformer is flux balanced over the entire switching period.
c) first two features result in unorthodox switching converter topology consisting of three switches only.
d) have the DC voltage gain dependent on the duty ratio only despite the half-wave sinusoidal resonant current present in the converter which is essential for its operation.

All other converters based on resonance have a DC voltage gain not only dependent on the resonant component values, but also of not being suitable for the duty ratio control. In these resonant converters the output voltage is controlled in a resonant circuit fashion by changing the ratio of switching frequency to the resonant frequency, which is not capable to regulate the output voltage over even the modest change in DC load currents due to high dependence on the resonance Q factor. However, the present invention employs the very simple duty ratio control of the output voltage and is independent on the load current and resonant component values.

The optimal control method introduced so far is constant OFF-time, variable ON-time control which ultimately means also a variable switching frequency. However, for the practical step-down conversion ratios, such as 10:1 and higher as used in experimental examples, the change of the ON-time interval is relatively small from the nominal value, so that even though a variable switching frequency is employed, the change of switching frequency is also small. However, if so desired, a constant switching frequency and variable duty ratio could be employed at the minor sacrifice in efficiency due to presence of zero coasting intervals and somewhat increased values of rms currents.

Conclusion

A three-switch step-down converter with a resonant inductor, a resonant capacitor and a hybrid transformer provides efficiency, size, cost and other performance advantages over the conventional buck converter and tapped-inductor buck converter.

The resonant inductor is connected to the primary of the isolation transformer. This insures the continuity of the primary and secondary currents of the hybrid transformer and therefore eliminates the current jump at the transition from ON-time interval to OFF-time interval present in conventional tapped-inductor buck converter thereby eliminating associated losses.

Despite the presence of the resonant inductor current during the OFF-time interval, the output voltage is neither dependent on resonant component values nor on the load current as in conventional resonant converters but dependent on duty ratio D and hybrid transformer turn ratio n. Hence a simple regulation of output voltage is achieved using duty ratio control only.

The dual inductive and capacitive energy storage and transfer together with lower voltage stresses on the switches results in increased efficiency and reduced size and cost compared to buck converter and tapped-inductor buck converters. Much reduced voltage stress on the synchronous rectifier switch also results in proportionally reduced size of the silicon needed for the switch implementation. Hence for 12V to 1V converter total cost of the silicon used for switches could be reduced fourfold.

The present invention also introduces a new hybrid switching method, which implements for the first time a use of odd number of switches, such as three in this case, which is strictly excluded from use in conventional Square-wave, Resonant and Quasi-resonant switching converters, which all require an even number of switches (2, 4, 6 etc.), operating as complementary pairs.

Finally, two identical converters can be used in two-phase extension In a such a way to reduce the output ripple current by a tenfold.

REFERENCES

1. Slobodan Cuk, "*Modelling, Analysis and Design of Switching Converters*", PhD thesis, November 1976, California Institute of Technology, Pasadena, Calif., USA.
2. Slobodan Cuk, R. D. Middlebrook, "*Advances in Switched-Mode Power Conversion*", Vol. 1, II, and III, TESLAco 1981 and 1983.

3. Vatche Vorperian, "*Resonant Converters*", PhD thesis, California Institute of Technology, Pasadena, Calif., USA;
4. Steve Freeland, "A Unified Analysis of Converters with Resonant Switches; II Input-Current Shaping for Single-Phase AC-DC Power Converters" PhD thesis, Oct. 20, 1987, California Institute of Technology, Pasadena, Calif., USA;
5. Dragan Maksimovic, "*Synthesis of PWM and Quasi-Resonant DC-to-DC Power Converters*", PhD thesis, Jan. 12, 1989, California Institute of Technology, Pasadena, Calif., USA.

What is claimed is:

1. A switching DC-to-DC converter for providing power from a DC voltage source connected between an input terminal and a common terminal to a DC load connected between an output terminal and said common terminal, said converter comprising:
   a first switch with one end connected to said input terminal;
   a second switch with one end connected to another end of said first switch and another end connected to said output terminal;
   a current rectifier switch with anode end connected to said common terminal;
   a resonant capacitor with one end connected to said another end of said first switch;
   a resonant inductor with one end connected to another end of said resonant capacitor;
   a first winding of a hybrid transformer with an unmarked end connected to another end of said resonant inductor and a dot-marked end connected to a cathode end of said current rectifier switch;
   a second winding of said hybrid transformer with an unmarked end connected to said dot-marked end of said first winding, and a dot-marked end of said second winding connected to said output terminal;
   switching means for keeping said first switch ON and said second switch and said current rectifier switch OFF during a $T_{ON}$ time interval, and keeping said first switch OFF and said second switch and said current rectifier switch ON during a $T_{OFF}$ time interval, where said $T_{ON}$ and said $T_{OFF}$ time interval are complementary time intervals within one switch operating cycle Ts;
   wherein said resonant inductor and said resonant capacitor form a resonant circuit during said $T_{OFF}$ time interval with a resonant current flowing through said first winding into said DC load;
   wherein a first turns ration of said hybrid transformer is a total number of turns of both said first winding and said second winding divided by a number of turns of said second winding of said hybrid transformer,
   wherein an input current during said $T_{ON}$ time interval stores an inductive energy in said first and said second winding and during said $T_{OFF}$ time interval said stored inductive energy is transferred to said DC load through said second winding by n times higher current than said input current,
   wherein a second turns ratio m of said hybrid transformer is the ratio between the number of turns of said first winding and said second winding of said hybrid transformer, wherein said resonant current in said first winding is amplified by said second turns ratio m of said hybrid transformer and sent to said DC load through said second winding of said hybrid transformer,
   wherein a duty ratio D is a ratio between said $T_{ON}$ time interval and said switching operating cycle Ts, and
   wherein a DC-to-DC voltage step-down conversion ratio of said converter depends on said duty ratio D and said first turns ratio n of said hybrid transformer.

2. A converter as defined in claim 1,
   wherein said first switch and said second switch are semiconductor MOSFET transistors;
   wherein said switching means include electronically controlling operation of said first switch relative to said second switch, whereby two transition intervals, a first transition interval and a second transition interval are created during which said first switch and said second switch are turned OFF, and
   whereby said first and said second transition intervals are adjusted to minimize switching losses of said first switch and said second switch.

3. A converter as defined in claim 1,
   wherein said first switch and said second switch are semiconductor MOSFET transistors,
   whereby said first switch and said second switch have substantially reduced conduction losses.

4. A converter as defined in claim 3,
   wherein said current rectifier switch is a semiconductor MOSFET transistor,
   wherein said switching means keep said current rectifier switch ON during said $T_{OFF}$ time interval and OFF during said $T_{ON}$ time interval, and
   whereby said current rectifier switch has substantially reduced conduction losses.

5. A converter as defined in claim 1,
   wherein an additional converter, same as said converter in claim 1, is connected in parallel to said converter in claim 1 to form a two-phase converter;
   wherein both said converters operate at equal duty ratios and same switching frequency;
   wherein said additional converter is synchronized to the operation of said converter in claim 1 but its switching is delayed by a half of said switching period Ts;
   whereby the sinusoidal-like ripple currents of each converter are out of phase from each other resulting in much reduced residual output ripple current of said two-phase converter to said DC load, and
   whereby the larger the voltage step-down the lower the output ripple current.

6. A converter as defined in claim 1,
   wherein said unmarked end of said second winding of said hybrid transformer is connected to said cathode end of said current rectifier switch and said dot-marked end of said second winding of said hybrid transformer is connected to said output terminal;
   whereby a DC-to-DC voltage step-don conversion ratio of said converter depends on said duty ratio D and said second turns ratio m between said first winding and said second winding of said hybrid transformer.

7. A switching DC-to-DC converter for providing power from a DC voltage source connected between an input terminal and a common terminal to a DC load connected between an output terminal and said common terminal, said converter comprising:
   a first switch with one end connected to said input terminal;
   a second switch with one end connected to another end of said first switch and another end connected to said common terminal;
   a current rectifier switch with anode end connected to said common terminal;
   a resonant capacitor with one end connected to said another end of said first switch;

a resonant inductor with one end connected to another end of said resonant capacitor;

a first winding of a hybrid transformer with an unmarked end connected to another end of said resonant inductor and a dot-marked end connected to a cathode end of said current rectifier switch;

a second winding of said hybrid transformer with an unmarked end connected to said dot-marked end of said first winding, and a dot-marked end of said second winding connected to said output terminal;

switching means for keeping said first switch ON and said second switch and said current rectifier switch OFF during a $T_{ON}$ time interval, and keeping said first switch OFF and said second switch and said current rectifier switch ON during a $T_{OFF}$ time interval, where said $T_{ON}$ time interval and said $T_{OFF}$ time interval are complementary time intervals within one switch operating cycle Ts;

wherein said resonant inductor and said resonant capacitor form a resonant circuit during said $T_{OFF}$ time interval with a resonant current flowing through said first winding of said hybrid transformer;

wherein a first turns ratio n of said hybrid transformer is a total number of turns of both said first winding and said second winding divided by a number of turns of said second winding of said hybrid transformer;

wherein an input current during said $T_{ON}$ time interval stores an inductive energy in said first and said second winding and during said $T_{OFF}$ time interval said stored inductive energy is transferred to said DC load through said second winding by n times higher current than said input current;

wherein a second turns ratio m of said hybrid transformer is the ratio between numbers of turns of said first winding and said second winding of said hybrid transformer;

wherein said resonant current in the said first winding is amplified by the said second turns ratio m of said hybrid transformer and sent to said DC load through said second winding of said hybrid transformer;

wherein a duty ratio D is a ratio between said $T_{ON}$ time interval and said switching operating cycle Ts, and whereby a DC-to-DC voltage step-down conversion ratio of said converter depends on said duty ratio D and said first turns ratio n of said hybrid transformer.

8. A converter as defined in claim 7, wherein said first switch and said second switch are semiconductor MOSFET transistors;

wherein said switching means include electronically controlling operation of said first switch relative to said second switch, whereby two transition intervals, a first transition interval and a second transition interval are created during which said first switch and said second switch are turned OFF, and whereby said first and said second transition intervals are adjusted to minimize switching losses of said first switch and said second switch.

9. A converter as defined in claim 8, wherein said first switch and said second switch have substantially reduced conduction losses.

10. A converter as defined in claim 9, wherein said current rectifier switch is a semiconductor MOSFET transistor, wherein said switching means keep said current rectifier switch ON during said $T_{OFF}$ time interval and OFF during said $T_{ON}$ time interval, and whereby said current rectifier switch has substantially reduced conduction losses.

11. A converter as defined in claim 7, wherein an additional converter, same as said converter in claim 8, is connected in parallel to said converter in claim 8 to form a two-phase converter;

wherein both said converters operate at equal duty ratios and same switching frequency;

wherein said additional converter is synchronized to the operation of said converter in claim 8 but its switching is delayed by a half of said switching period Ts ;

whereby the sinusoidal-like ripple currents of each converter are out of phase from each other resulting in much reduced residual output ripple current of said two-phase converter to said DC load, and whereby the larger the voltage step-down the lower the output ripple current.

12. A converter as defined in claim 7, wherein said unmarked end of said second winding of said hybrid transformer is connected to said cathode end of said current rectifier switch and said dot-marked end of said second winding of said hybrid transformer is connected to said output terminal;

whereby a DC-to-DC voltage step-down conversion ratio of said converter depends on said duty ratio D and said second turns ratio m between said first winding and said second winding of said hybrid transformer.

13. A hybrid switching method for non-isolated large step-down DC-to-DC power conversion comprising:

providing a main controllable three-terminal switch conducting and supplying current to a DC load during an ON-time interval $T_{ON}$ and non-conducting during an OFF-time interval $T_{OFF}$ within a switching time period Ts where D is a controllable duty ratio;

providing a complementary controllable three-terminal switch and a two-terminal current rectifier switch conducting and supplying current to said DC load during said OFF-time interval $T_{OFF}$ and non-conducting during said ON-time interval $T_{ON}$;

providing a first and a second winding of a hybrid transformer operating and being flux-balanced during the entire said switching time period Ts;

providing said hybrid transformer with a first turns ratio n being a ratio of the sum of said first and second winding turns divided by said second winding turns;

providing said hybrid transformer with a second turns ratio m being a ratio between said first winding turns and said second winding turns;

providing a resonant inductor operating and being flux-balanced during said OFF-time interval $T_{OFF}$;

providing said first and said second winding of said hybrid transformer to store an inductive energy during said ON-time interval $T_{ON}$ and release said inductive energy through said second winding and said two-terminal current rectifier switch to said DC load during said OFF-time interval $T_{OFF}$;

providing a resonant capacitor which stores a capacitive energy during said ON-time interval $T_{ON}$ and releases said capacitive energy during said OFF-time interval $T_{OFF}$ by both a resonant current directly to said DC load through said first winding and by an amplified resonant current in said second winding by said turns ratio m of said hybrid transformer to said DC load;

providing said resonant inductor and said resonant capacitor form a resonant circuit during said OFF-time interval $T_{OFF}$ having a constant resonant period two times longer than said OFF-time interval $T_{OFF}$;

wherein a duty ratio D is a ratio between said $T_{ON}$ time interval and said switching operating cycle Ts, and whereby a DC-to-DC voltage step-down conversion ratio of said converter depends on said duty ratio D and said first turns ratio n of said hybrid transformer.

14. A hybrid switching method for non-isolated large step-down DC-to-DC power conversion as in claim 13 wherein a switching frequency is controlled to keep said OFF-time period constant and thereby improve efficiency.

15. A hybrid switching method for non-isolated large step-down DC-to-DC power conversion as defined in claim 14 wherein said main and said complementary controllable three-terminal switches are MOSFET transistors.

16. A hybrid switching method for non-isolated large step-down DC-to-DC power conversion as defined in claim 15 wherein said two-terminal current rectifier switch is a MOSFET transistor being turned ON and OFF as a synchronous rectifier to reduce conduction losses.

17. A hybrid switching method for non-isolated large step-down DC-to-DC power conversion as defined in claim 13 to form a two-phase converter comprising an additional converter connected to the same DC source and the same DC load wherein both said converters operate at equal duty ratios and same switching frequency;

wherein said additional converter is synchronized to the operation of said converter in claim 13 but its switching is delayed by a half of said switching period Ts;

whereby the sinusoidal-like ripple currents of each converter are out of phase from each other resulting in much reduced residual output ripple current of said two-phase converter to said DC load, and whereby the larger the voltage step-down the lower the output ripple current.

* * * * *